United States Patent
Lu et al.

(10) Patent No.: US 12,517,301 B2
(45) Date of Patent: Jan. 6, 2026

(54) PHOTON SOURCE AND OPTICAL COMPUTING ARCHITECTURE

(71) Applicant: Taiwan Semiconductor Manufacturing Company, Ltd., Hsinchu (TW)

(72) Inventors: Chih-Hsin Lu, Tainan (TW); Chia-Chia Lin, Kaohsiung (TW); Chung-Hao Tsai, Huatan Township (TW); Chuei-Tang Wang, Taichung (TW); Chen-Hua Yu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 129 days.

(21) Appl. No.: 18/308,794

(22) Filed: Apr. 28, 2023

(65) Prior Publication Data
US 2024/0361521 A1   Oct. 31, 2024

(51) Int. Cl.
  *G02B 6/12*   (2006.01)
  *G02B 6/13*   (2006.01)
  *G02B 6/293*   (2006.01)

(52) U.S. Cl.
  CPC .......... *G02B 6/12007* (2013.01); *G02B 6/13* (2013.01); *G02B 6/29338* (2013.01)

(58) Field of Classification Search
  CPC .............. G02B 6/29338; G02B 6/2934; G02B 6/29341; G02B 6/29343
  See application file for complete search history.

(56) References Cited

U.S. PATENT DOCUMENTS

| | | | |
|---|---|---|---|
| 6,865,314 B1 * | 3/2005 | Blair .................. | G02B 6/12007 385/27 |
| 9,490,605 B2 | 11/2016 | Gaeta et al. | |
| 9,620,489 B2 | 4/2017 | Lipson et al. | |
| 9,759,863 B1 * | 9/2017 | Peng ....................... | G02B 6/14 |
| 11,079,376 B1 | 8/2021 | Najar | |
| 11,315,855 B2 | 4/2022 | Chen et al. | |
| 2012/0134628 A1 * | 5/2012 | Hoekman .......... | G02B 6/29338 385/50 |

(Continued)

FOREIGN PATENT DOCUMENTS

| | | |
|---|---|---|
| CN | 107111060 A | 8/2017 |
| CN | 108603980 A | 9/2018 |

(Continued)

*Primary Examiner* — Chad H Smith
(74) *Attorney, Agent, or Firm* — Eschweiler & Potashnik, LLC

(57) ABSTRACT

A photonic integrated circuit (PIC) with a first structure of a ordinary optical material is enhanced with a second structure of a nonlinear optical material. The second structure provides or enhances nonlinear optical effects within the PIC. The first structure and the second structure may be in distinct layers. The first structure may be directly over and in contact with the second structure. Alternatively, the first structure and the second structures may be evanescently coupled while being vertically separated by a layer of cladding material. Lateral spacing may be used in combination with vertically spacing to precisely control a degree coupling between the first structure and the second structure.

20 Claims, 40 Drawing Sheets

(56) References Cited

U.S. PATENT DOCUMENTS

| | | |
|---|---|---|
| 2014/0321502 A1* | 10/2014 | Ahmed .................. G01K 11/00 |
| | | 374/130 |
| 2015/0003775 A1 | 1/2015 | Saado |
| 2017/0141539 A1 | 5/2017 | Ring |
| 2017/0207600 A1 | 7/2017 | Klamkin et al. |
| 2019/0101711 A1* | 4/2019 | Van Campenhout ... H01S 5/021 |
| 2020/0310035 A1 | 10/2020 | Bhargava et al. |
| 2021/0063655 A1* | 3/2021 | Chandran .......... G02B 6/29338 |
| 2021/0088727 A1* | 3/2021 | Park ...................... H01S 5/1064 |
| 2021/0175685 A1* | 6/2021 | Aihara ...................... G02F 1/01 |
| 2021/0232018 A1 | 7/2021 | Zhang et al. |
| 2021/0242654 A1 | 8/2021 | Tang et al. |
| 2022/0299839 A1 | 9/2022 | Jiang et al. |
| 2022/0365284 A1 | 11/2022 | Song et al. |

FOREIGN PATENT DOCUMENTS

| | | |
|---|---|---|
| CN | 111367015 A | 7/2020 |
| CN | 111830636 A | 10/2020 |
| CN | 114303081 A | 4/2022 |
| JP | 2016027380 A | 2/2016 |
| TW | 202244551 A | 11/2022 |

\* cited by examiner

PHOTON SOURCE AND OPTICAL COMPUTING ARCHITECTURE

BACKGROUND

Photonic integrated circuits (PICs) are widely used in communications and are increasingly being used for sensing and computing. PICs may operate at higher speeds than electrical (IC) integrated circuits. A PIC include two or more photonic devices coupled to form a circuit. Examples of photonic devices include waveguides, splitters, multiplexers, filters, modulators, sensors, and switches. PICs may interface with ICs through lasers, photodiodes, and the like to provide additional functionality. As with ICs, there is an ongoing need to provide PICs with ever higher component densities.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
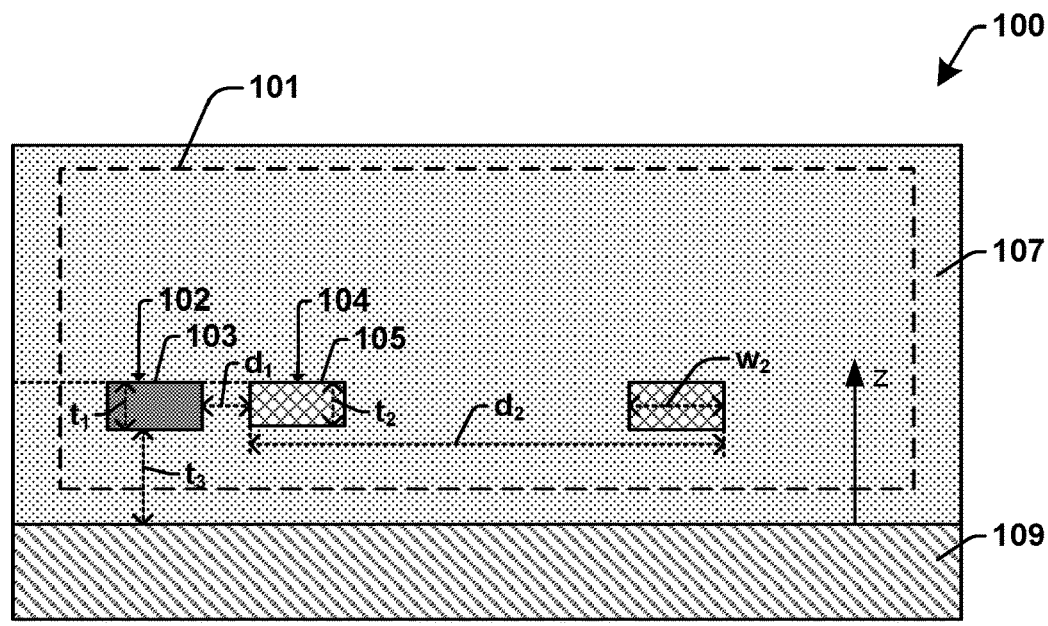
FIGS. 1A-1B illustrate cross-sectional side and plan views of a PIC device according to some embodiments of the present disclosure.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Photonic devices are made with optical material. An optical material is transparent and has a higher refractive index than cladding that may surround the optical material. The molecules of an ordinary optical material have either non-crystalline (glass) or centrosymmetric crystalline structure. As the terms is used herein, a nonlinear optical material is one that has a non-centrosymmetric crystalline structure. In contrast to an ordinary optical material, a nonlinear optical material has a non-zero second-order nonlinear susceptibility and exhibits the Pockels effect. The Pockels effect causes a variation in refractive index that is linear in relation to the strength of an applied electric field.

In accordance with some aspects of the present disclosure, a photonic integrated circuit (PIC) with structures of an ordinary optical material is enhanced with structures of a nonlinear optical material. In some embodiments, the nonlinear optical material has a second-order nonlinear susceptibility of at least about $10^{-24}$ $As/V^2$. The nonlinear optical material may provide or enhance nonlinear optical effects within the PIC. Examples of nonlinear optical effects that may be provided or enhanced include parametric down-conversion (frequency doubling), sum-frequency generation, optical parametric generation, optical parametric amplification, optical parametric oscillation, optical rectification, and the like.

Some aspects of the present disclosure relate to a PIC comprising a first device of an ordinary optical material directly coupled to a second device of a nonlinear optical material. In some embodiments, the first device and the second device are separated by a layer of cladding and are evanescently coupled. In some embodiments, the first device and the second device are in direct contact. In some embodiments, the first device is a waveguide, and the second device is an optical resonator such as a ring resonator, a disk resonator, or the like. In some embodiments, both the first device and the second device are optical resonators. In some embodiments both the first device and the second device are waveguides that are components of a more complex device such as a Mach-Zehnder interferometer or the like. In some embodiments, the second device is connected in parallel with the first device within the PIC. The PIC may have low transmission losses due to the ordinary optical material and enhanced nonlinear optical effects due to the nonlinear optical material.

In some embodiments the second device is in a separate layer from the first device so that the first device and the second device are at different heights above a substrate. In some embodiments, the second device is directly over or directly under the first device and is in direct contact with the second device. Forming the first device and the second device in separate but adjacent layers facilitates placing the distinct materials of the first device and the second device in direct contact.

In some embodiments, a cladding layer is disposed between a first layer that contains the first device and a second layer that contains the second device. In some embodiment a spacing between the first device and the second device is determined by a thickness of the cladding layer. The thickness of the cladding layer can be controlled more easily than a lateral spacing between the first device and the second device. It is desirable to finely control the spacing between the first device and the second device so that a degree of evanescent coupling between the first device and the second device may be predetermined. In some embodiments, the spacing between the first device and the second device provides critical coupling. If the devices are closer than a distance that provides critical coupling, the devices will be over coupled. If the devices are further apart than the distance that provides critical coupling, the devices will be under coupled.

Some aspects of the present teachings relate to a first photonic device and a second photonic device that are evanescently coupled in a PIC wherein the first photonic device is in a first layer, the second photonic device is in a second layer, and the first and second layers are separated by a cladding layer. In some embodiments, the second photonic device is laterally offset from the first photonic device as well as being in a separate layer. When the two devices are in separate layers, the degree of coupling between the two devices changes more slowly with respect to lateral displacement as compared to when the two devices are in the same layer. This allows the degree of coupling to be controlled with greater precision for a given accuracy within which the lateral displacement can be controlled. In some embodiments there are a plurality of device pairs coupled between the first layer and the second layer. The lateral offset may be variable among the device pairs whereby various degrees of coupling are achieved.

Some aspects of the present disclosure relate to a method of forming a PIC device. The method includes forming a first device layer with a first photonic device inlaid within cladding, forming a spacer layer of cladding, and forming a second device layer with a second photonic device inlaid within cladding above the spacer layer. In some embodiments, the spacer layer determines the spacing between the first device and the second device. In some embodiments, the second photonic device is laterally offset from the first photonic device so that the spacing is determined by the vertical offset and the lateral offset. In some embodiments, the second device is of nonlinear optical material and the first device is of an ordinary optical material.

Some aspects of the present disclosure relate to another method of forming a PIC device. The method includes forming a first device layer containing a first photonic device of an ordinary optical material inlaid within cladding and forming a second device layer containing a second photonic device of a nonlinear optical material above the first device layer. In some embodiments, the first photonic device and the second photonic device are in direct contact. In some embodiments, the first photonic device and the second photonic device are evanescently coupled but separated by a layer of the cladding.

Some aspects of the present disclosure relate to another method of forming a PIC device. In this method, a first waveguide of a first optical material is formed in a layer of cladding material over a carrier substrate. In some embodiments, the first optical material is silicon (Si) or the like. A first metal interconnect and a bonding layer are formed above the cladding material. In some embodiments, the first waveguide is functionally connected to the first metal interconnect. The partially manufactured device is flipped over (from a manufacturing perspective) and the carrier substrate is ground away. Additional cladding material may then be deposited. A second waveguide of a second optical material is formed over the inverted cladding layer. In some embodiments, the second optical material has a distinct composition from the first optical material. In some embodiments, the second optical material is a standard optical material. Is some embodiments, the second optical material is silicon nitride (SiN) or the like. Additional processing takes place to complete the formation of a photonic integrated circuit (PIC). In some embodiments, the additional processing includes forming a photonic device of a nonlinear optical material. In some embodiments, the nonlinear optical material is aluminum nitride (AlN) or the like. One or more vias are then formed and used to make electrical connections with the PIC. This process allows the first waveguide and related photonic circuit components to be formed proximate the first metal interconnect on the front side of the cladding layer and the second waveguide and other photonic circuit components to be formed proximate an opposite side of the cladding layer that is proximate the back side. This structure facilitates forming low resistance connections to photonic circuit components in the same layer as, or otherwise close to, the second waveguide.

Figure 1B:
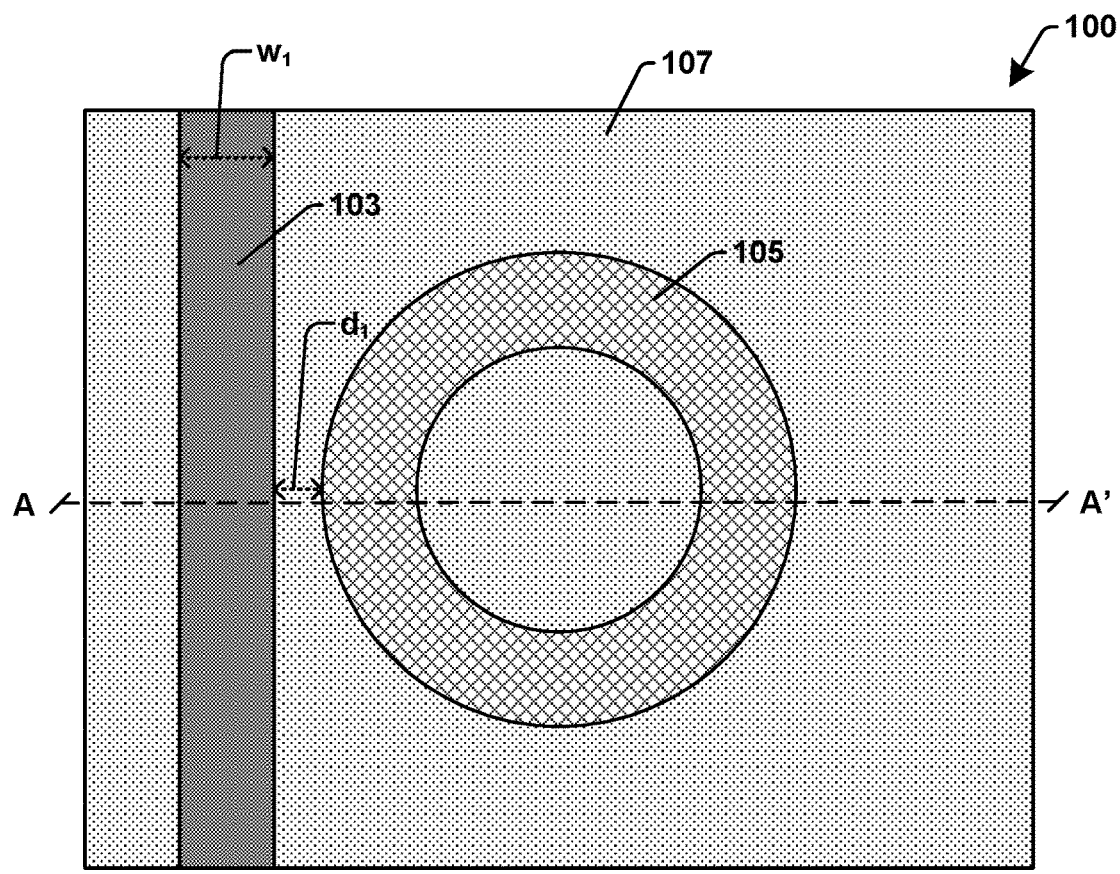

FIG. 1A illustrates a cross-sectional view and FIG. 1B illustrates a plan view of a PIC device 100. FIG. 1A corresponds to the line A-A' of FIG. 1B. The PIC device 100 includes a waveguide 103 and a ring resonator 105, which are two components in a PIC 101. The waveguide 103 and the ring resonator 105 are surrounded by cladding 107 and are separated by a distance $d_1$. The distance $d_1$ is such that the waveguide 103 and the ring resonator 105 are directly coupled in the PIC 101 through evanescent coupling.

In some embodiments, the distance $d_1$ is in the range from about 10 nm to about 80 nm. In some embodiments, the distance $d_1$ is in the range from about 80 nm to about 400 nm. In some embodiments, the distance $d_1$ is such the waveguide 103 and the ring resonator 105 are critically coupled. In some embodiments, the distance $d_1$ is such the waveguide 103 and the ring resonator 105 are over coupled.

The ring resonator 105 is composed of or includes a nonlinear optical material. The nonlinear optical material has a non-centrosymmetric crystalline structure. In some embodiments, the nonlinear optical material is CMOS process compatible. Examples of materials that have these characteristic include aluminum nitride (AlN), lithium niobate (LiNbO$_3$), silicon carbide (SiC), indium phosphide (InP), gallium arsenide (GaAs), aluminum gallium arsenide (AlGaAs), and the like. In some embodiments, the nonlinear optical material is aluminum nitride (AlN) or the like. AlN is particularly well suited to CMOS compatible processing and may be used to provide a variety of nonlinear optical effects.

The waveguide 103 may be formed of any suitable material. In some embodiments, the waveguide 103 is made of or includes a first optical material. The first optical material is an ordinary optical material, one that has a non-crystalline or centrosymmetric crystalline structure. Examples of optical materials with non-crystalline or centrosymmetric crystalline structure include silicon (Si), silicon nitride (SiN), and the like. In some embodiments, the first optical material has lower losses than the nonlinear optical material. In some embodiments, the first optical material is Si$_3$N$_4$ or the like. Silicon nitride has very low losses even at high transmission rates. Photonic integrated circuits may operate at visible or near infrared wavelengths and the optical properties referred to herein are applicable in that wavelength range.

The waveguide 103 may have any suitable dimensions. In some embodiments, the waveguide 103 has a width $w_1$ in the range from about 500 nm to about 2000 nm. In some embodiments, the width $w_1$ is in the range from about 800 nm to about 1600 nm. In some embodiments, the waveguide 103 has a thickness $t_1$ in the range from about 100 nm to about 500 nm. In some embodiments, the thickness $t_1$ is in the range from about 300 nm to about 1000 nm.

The ring resonator 105 may have a thickness $t_2$ that is similar to the thickness $t_1$, however, these thicknesses may be different. The thicknesses may be different due to the processing used to provide structures of two distinct materials in one layer of the cladding 107. In some embodiments, the waveguide 103 and the ring resonator 105 have vertically aligned upper surfaces 102 and 104 but have lower surfaces that are at different heights over a substrate 109.

The ring resonator 105 may have any suitable dimensions. In some embodiments, the ring resonator has a width $w_2$ in the range from about 300 nm to about 3000 nm. In some embodiments, the width $w_2$ is in the range from about 500 nm to about 2000 nm. In some embodiments, the ring resonator has an outer diameter $d_2$ in the range from about 1 μm to about 1000 μm. In some embodiments, the outer diameter $d_2$ is in the range from about 10 μm to about 200 μm.

The cladding 107 has a lower refractive index than either the waveguide 103 or the ring resonator 105. In some embodiments, the cladding 107 is silicon dioxide (SiO$_2$) or the like. SiO$_2$ has a refractive index of about 1.45. In some embodiments, the waveguide 103 has a refractive index of at least about 2.0. In some embodiments, the ring resonator 105 has a refractive index of at least about 2.0. SiN and AlN both have refractive indexes greater than 2.0.

The substrate 109 has the dimensions of a chip or wafer so that it defines a vertical direction, z, but is otherwise to be understood in the broadest possible sense. The substrate 109 may be, for example, a bulk semiconductor substrate, a silicon on insulator substrate (SOI), a sapphire substrate, the like, or any other suitable type of substrate. The semiconductor may be silicon (Si), a group III-V semiconductor or some other binary semiconductor (e.g., GaAs), a tertiary semiconductor (e.g., AlGaAs), a higher order semiconductor, or the like. The PIC device 100 may be in a 3D semiconductor package. An carrier substrate on which the cladding 107, the waveguide 103, and the ring resonator 105 were formed may have been ground away after bonding to the substrate 109 in which case there may be a bonding structure or metal interconnect (not shown) between the cladding 107 and the substrate 109.

The PIC 101 has components in addition to the ones that are shown. Those additional components may include a light source such as a light-emitting diode, a laser diode, or the like or a coupler to an external light source such as a grating coupler, an edge coupler, or the like. The PIC 101 may include a photodiode or the like for generating electrical signals from optical signals or another coupler for transmitting an output of the PIC 101. In some embodiments, the waveguide 103 is both the only optical input to and the only optical output from the ring resonator 105, in which case the ring resonator 105 is considered connected in parallel within the PIC 101.

During operation of the PIC 101 first photons, which have frequency $h_1$, may propagate through the waveguide 103. Evanescent coupling results in a net flux of the first photons from the waveguide 103 to the ring resonator 105. Some of those first photons are converted within the ring resonator 105 to second photons having a frequency $h_2$. This results in a net flux of first photons from the waveguide 103 to the ring resonator 105 and a net flux of second photons from the ring resonator 105 to the waveguide 103. In some embodiments, the frequency $h_2$ is double the frequency $h_1$, which is a type of nonlinear effect (frequency doubling). Other nonlinear effects may be achieved using the ring resonator 105 such as parametric down-conversion, optical parametric generation, optical parametric oscillation, and the like. The effects are dependent on the wavelengths of light propagated through the waveguide 103.

Figure 2A:
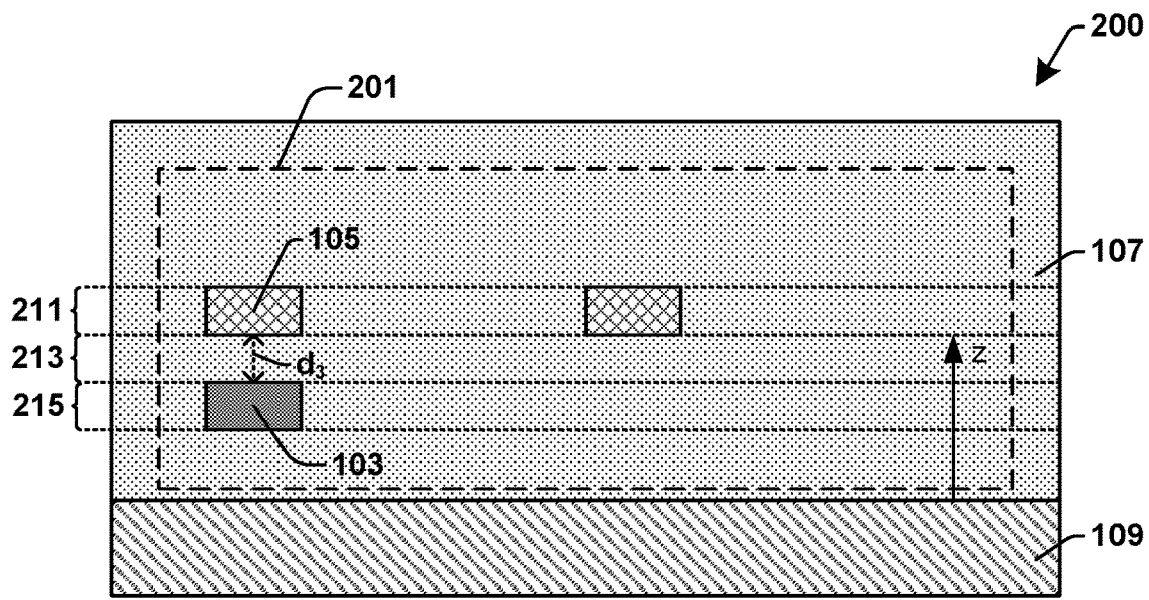
FIGS. 2A-2B illustrate cross-sectional side and plan views of a PIC device according to some other embodiments.
Figure 2B:
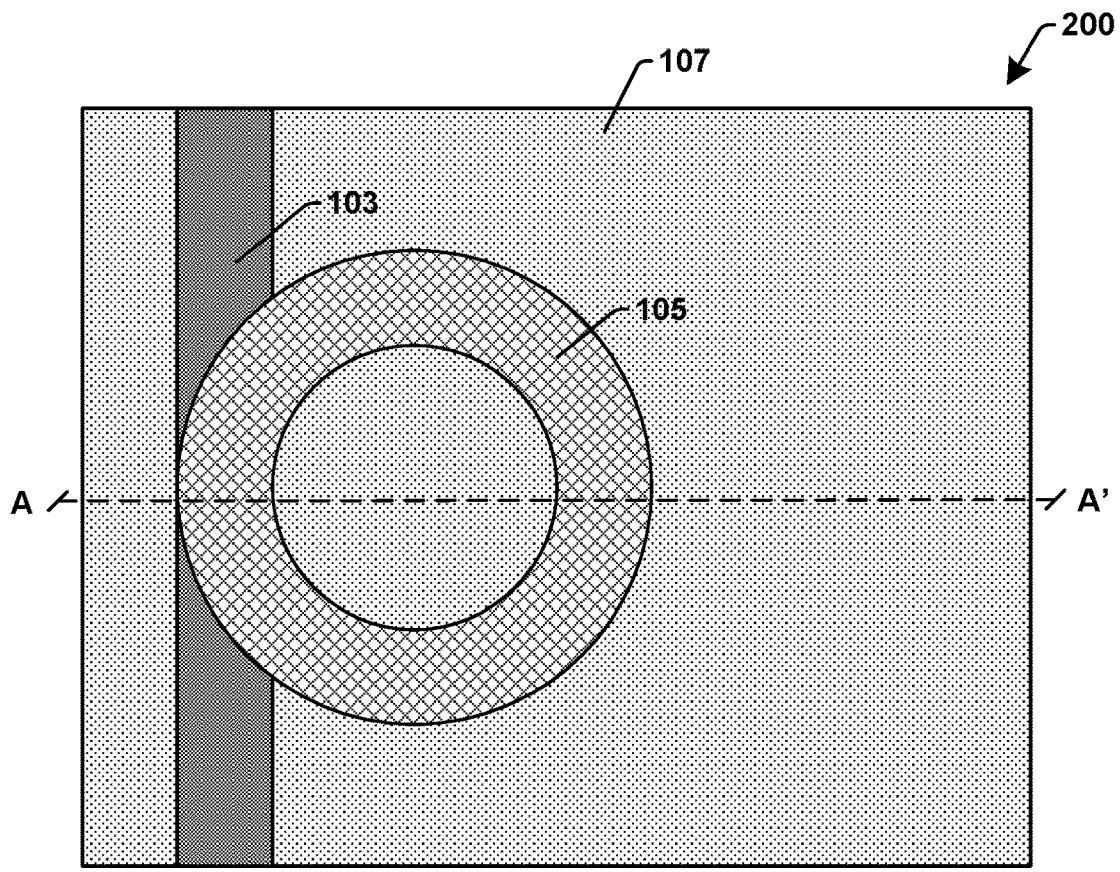

FIGS. 2A and 2B illustrate cross-sectional and plan views of a PIC device 200 which includes a PIC 201. The PIC 201 may be like the PIC 101 of FIGS. 1A-1B except that in the PIC 201 the ring resonator 105 is directly over the waveguide 103 and the ring resonator 105 and the waveguide 103 are inlaid within separate layers of the cladding 107. The waveguide 103 is inlaid within a first device layer 215 and the ring resonator is inlaid within a second device layer 211. The first device layer 215 and the second device layer 211 are separated by a cladding layer 213. The cladding layer 213 has a thickness $d_3$, which is also the distance between the ring resonator 105 and the waveguide 103. The thickness of the cladding layer 213 controls a degree of coupling between the waveguide 103 and the ring resonator 105. This configuration provides enhanced control over the coupling between the waveguide 103 and the ring resonator 105 in comparison to the configuration of FIGS. 1A-1B.

Figure 3A:
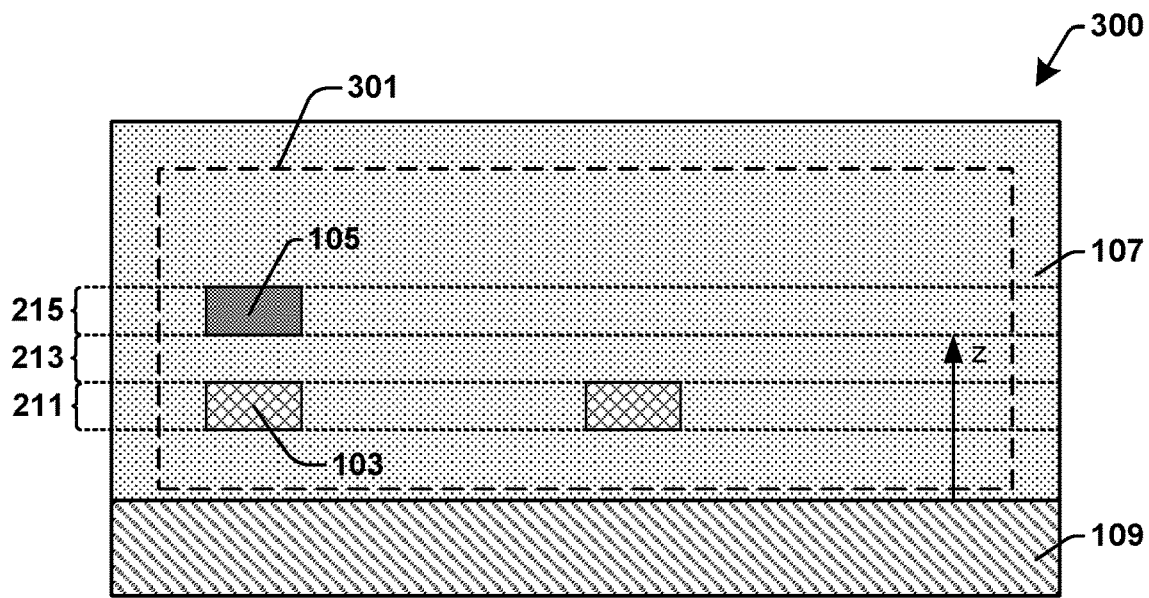
FIGS. 3A-3B illustrate cross-sectional side and plan views of a PIC device according to some other embodiments.
Figure 3B:
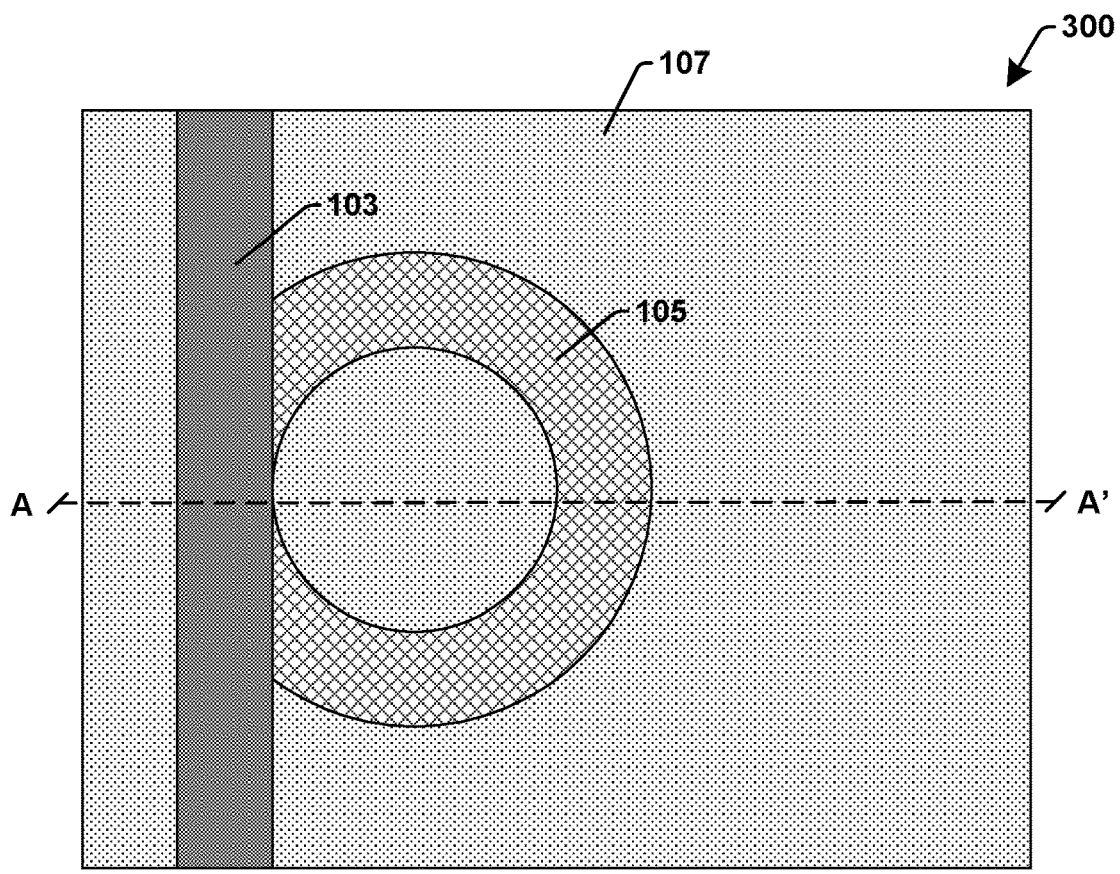

FIGS. 3A and 3B illustrate cross-sectional and plan views of a PIC device 300 which includes a PIC 301. The PIC 301 is like the PIC 201 of FIGS. 2A-2B except that in the PIC 301 the ring resonator 105 is directly under the waveguide 103. The same effects may be achieved whether the nonlinear photonic device is above or below the ordinary photonic device.

Figure 4A:
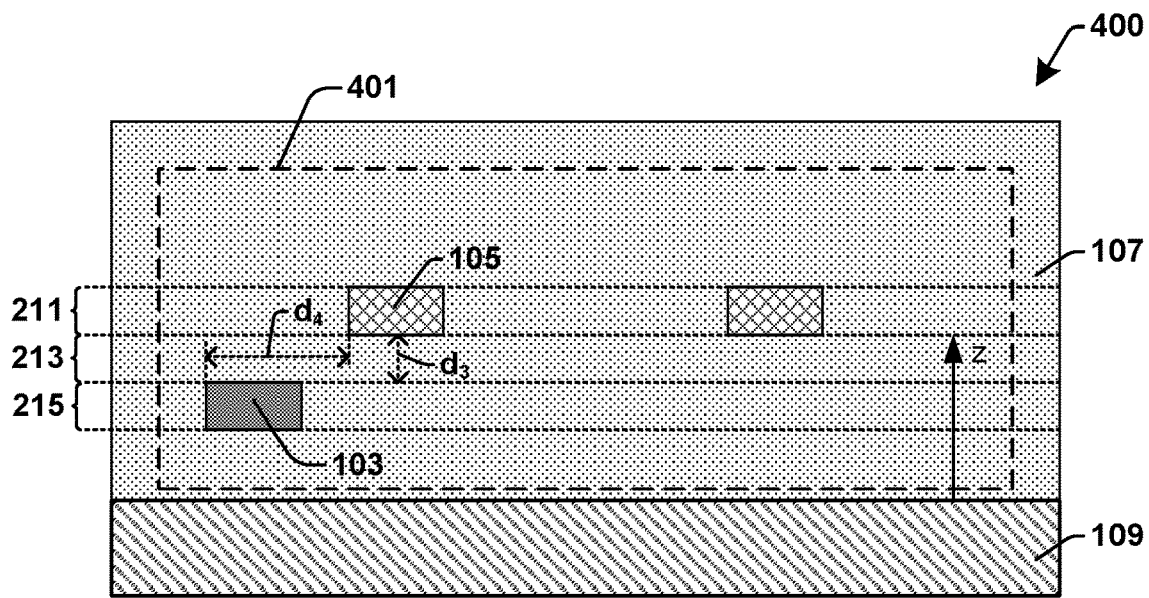
FIGS. 4A-4B illustrate cross-sectional side and plan views of a PIC device according to some other embodiments.
Figure 4B:
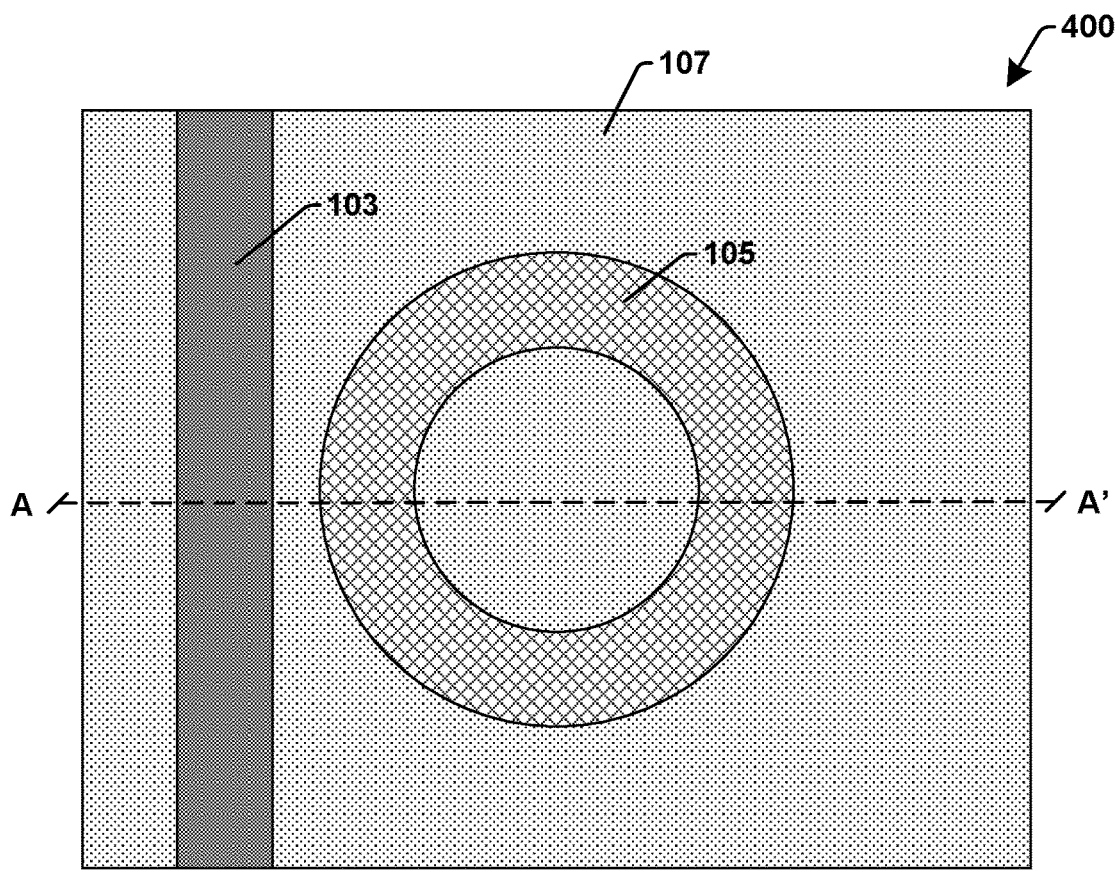

FIGS. 4A and 4B illustrate cross-sectional and plan views of a PIC device 400 which includes a PIC 401. The PIC 401 is like the PIC 201 of FIGS. 2A-2B except that in the PIC 401 the ring resonator 105 is laterally offset by a distance $d_4$ from the waveguide 103 as well as being vertically offset by a distance $d_3$. In some embodiments, the distance $d_4$ is in the range from about 10 nm to about 80 nm. In some embodiments, the distance $d_4$ is in the range from about 80 nm to about 400 nm. In some embodiments, the distances $d_3$ and $d_4$ are such the waveguide 103 and the ring resonator 105 are critically coupled. In some embodiments, the distances $d_3$ and $d_4$ are such the waveguide 103 and the ring resonator 105 are over coupled. Comparing FIG. 1A, the variation in coupling between the waveguide 103 and the ring resonator 105 that occurs with respect to lateral displace is slower when the waveguide 103 and the ring resonator 105 are in different layers of the cladding 107 as compared to when they are in the same layer.

Figure 5A:
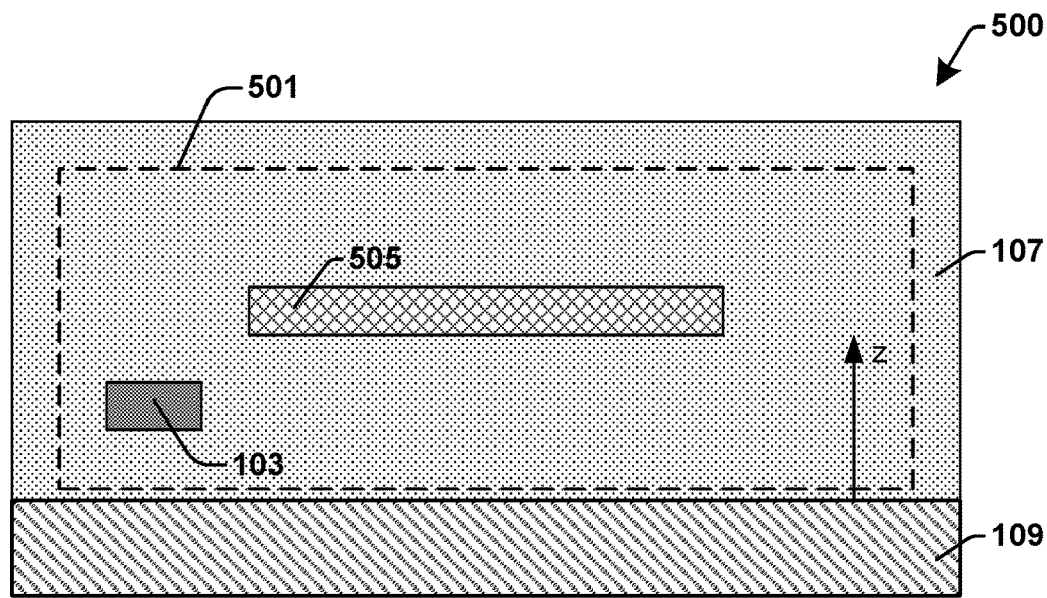
FIGS. 5A-5B illustrate cross-sectional side and plan views of a PIC device according to some other embodiments.
Figure 5B:
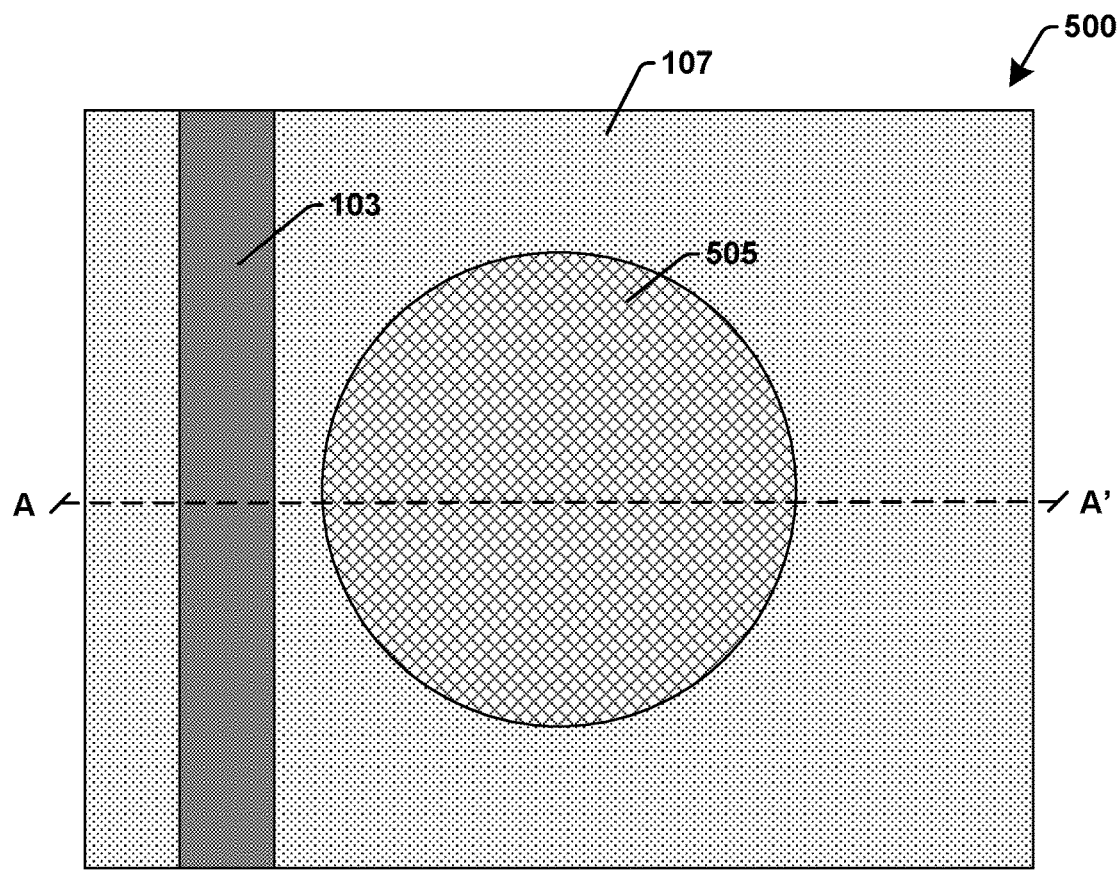

FIGS. 5A and 5B illustrate cross-sectional and plan views of a PIC device 500 which includes a PIC 501. The PIC 501 is like the PIC 401 of FIGS. 4A-4B except that in the PIC 501 the ring resonator 105 (see FIG. 4A) is replaced by a disk resonator 505. The disk resonator 505 may have higher intrinsic losses (lower Q factor) than the ring resonator 105, however, the disk resonator 505 is less sensitive to manufacturing tolerances and can be made more compact.

Figure 6A:
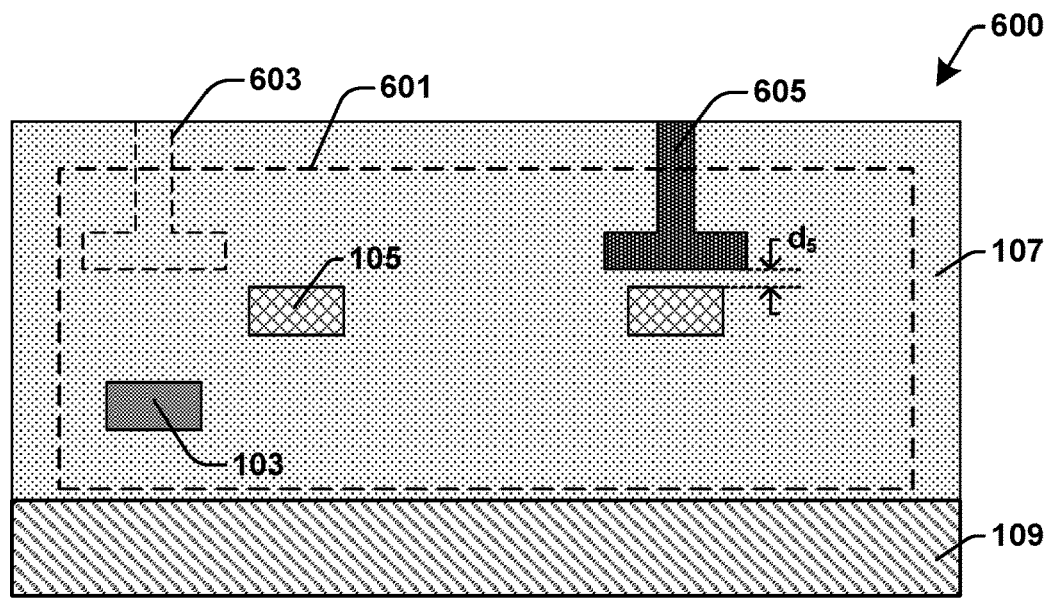
FIGS. 6A-6B illustrate cross-sectional side and plan views of a PIC device according to some other embodiments.
Figure 6B:
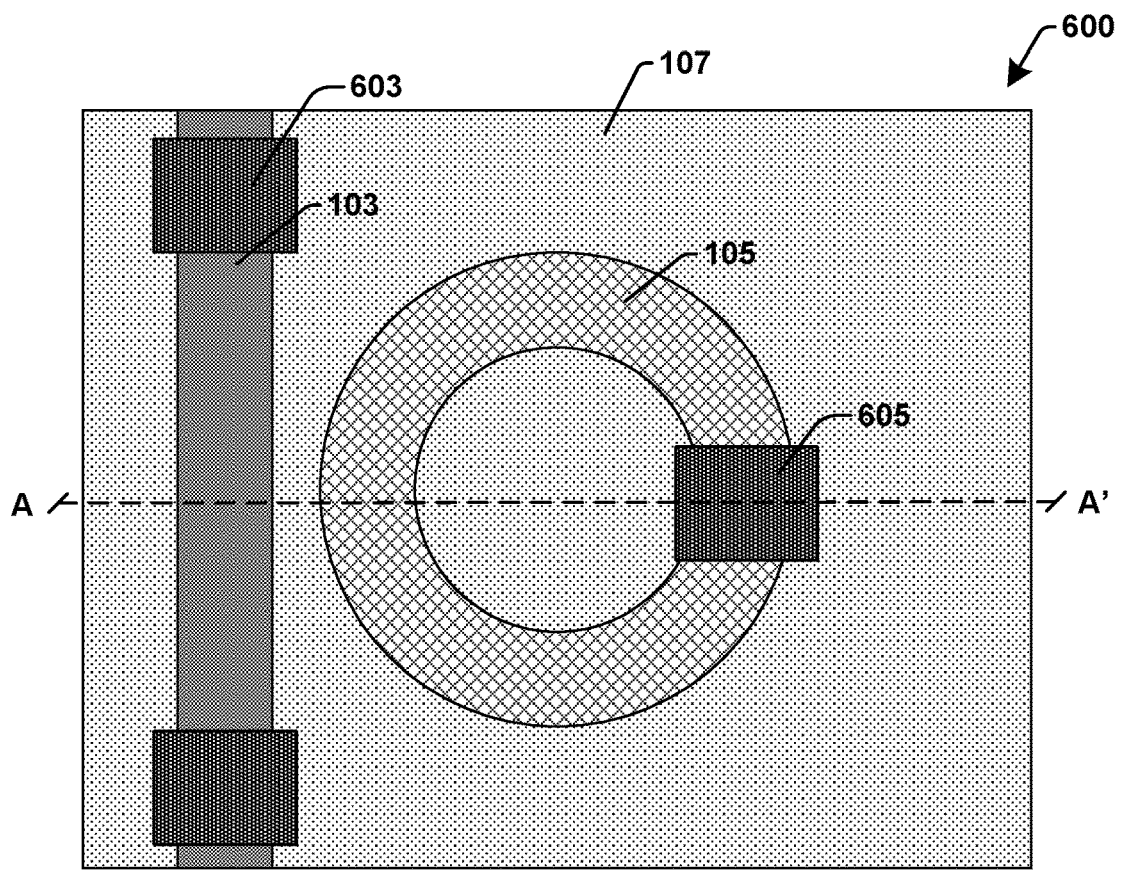

FIGS. 6A and 6B illustrate cross-sectional and plan views of a PIC device 600 which includes a PIC 601. The PIC 601 is like the PIC 401 of FIGS. 4A-4B except that in the PIC 601 a heating element 605 is in proximity to the ring resonator 105 and heating elements 603 are in proximity to the waveguide 103. The heating elements 603 are positioned to selectively heat and change the refractive index the waveguide 103 and the heating element 605 is positioned to selectively heat and change the refractive index of the ring resonator 105. Either the heating elements 603 or the heating element 605 may be operated to fine-tune the coupling between the waveguide 103 and the ring resonator 105. Accordingly, either the heating elements 603 or the heating element 605 may be omitted from the PIC device 600. Including both types of heating elements facilitates the fine tuning. The fine tuning provided by the heating elements 603 and/or the heating element 605 may be used to compensate for manufacturing variations, in which case fine tuning may be achieved with less heating if the manufacturing variations are reduced. The heating elements 605 is a distance $d_5$ from the ring resonator 105. In some embodiments, the distance $d_5$ is in the range from about 500 nm to about 5 µm. In some embodiments, the distance $d_5$ is in the range from about 1 µm to about 2 µm. Making $d_5$ smaller improves the selectivity of the heating.

Figure 7A:
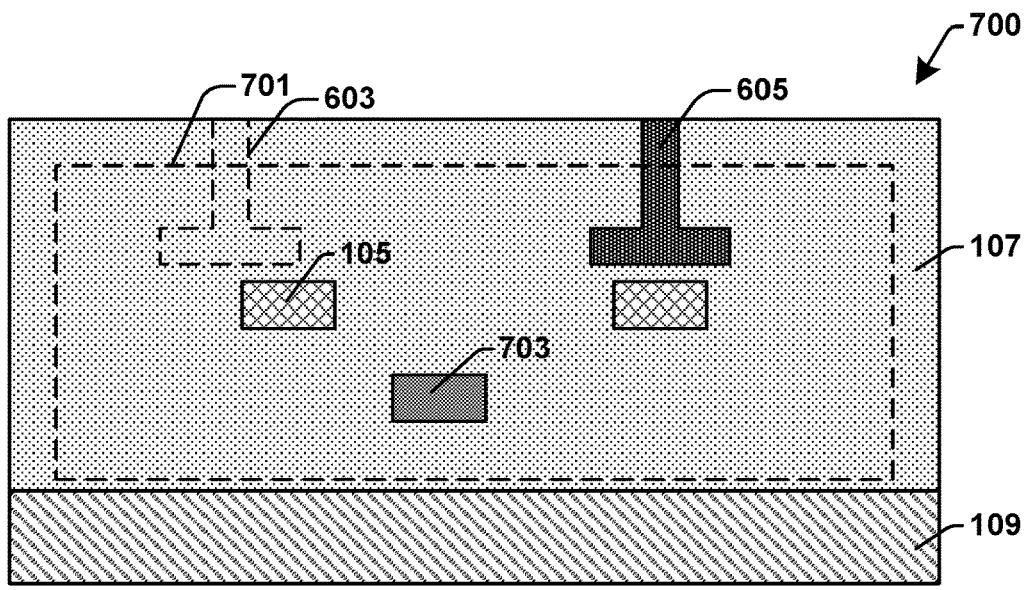
FIGS. 7A-7B illustrate cross-sectional side and plan views of a PIC device according to some other embodiments.
Figure 7B:
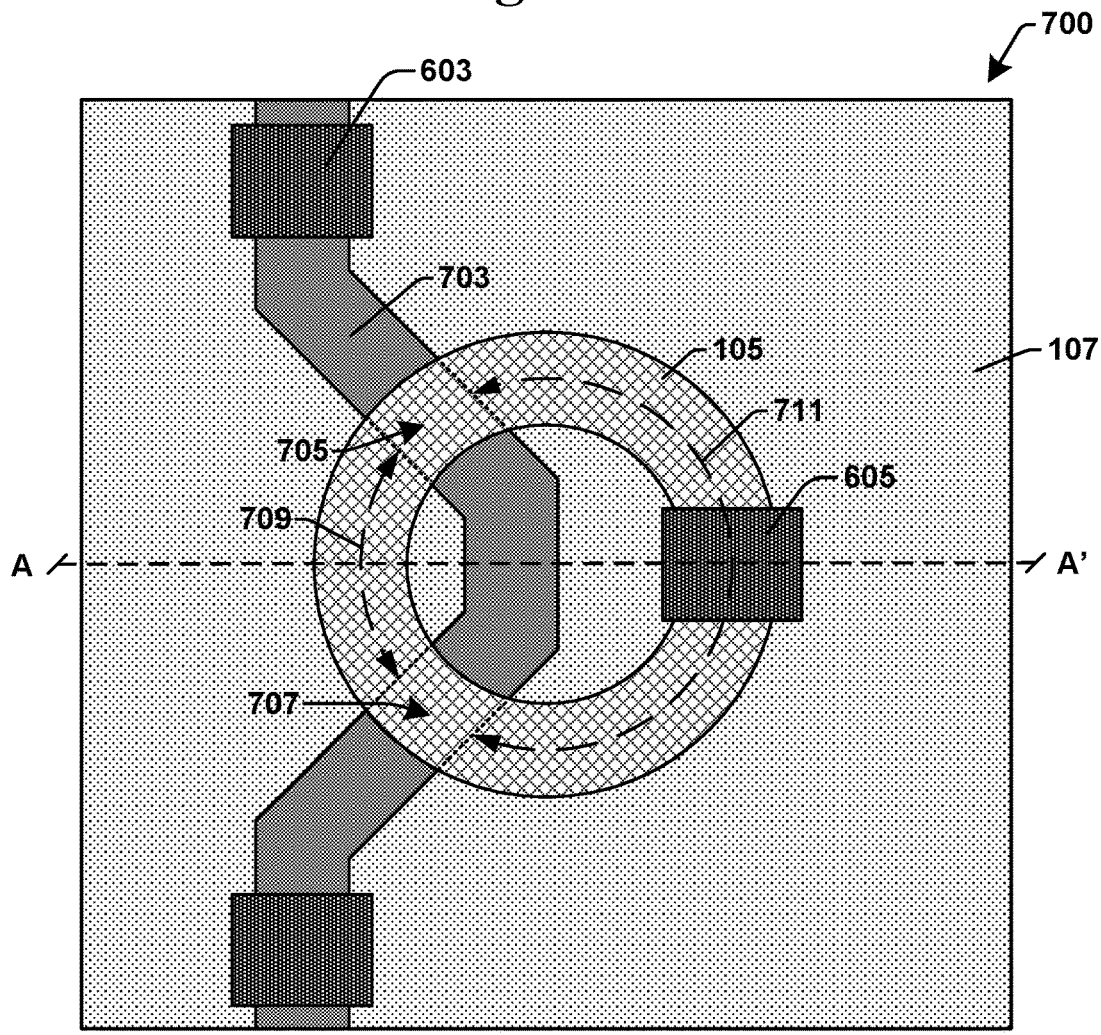

FIGS. 7A and 7B illustrate cross-sectional and plan views of a PIC device 700 which includes a PIC 701. The PIC 701 is like the PIC 601 of FIGS. 6A-6B except that the PIC 701 has the waveguide 703 rather than the waveguide 103. The waveguide 703 differs from the waveguide 103 in shape and geometric relationship to the ring resonator 105. The waveguide 703 bends so that it passes under the ring resonator 105 in two disjoint areas, a first area 705 and a second area 707. In some embodiments, the waveguide 703 runs perpendicular to the ring resonator 105 in the first area 705 and in the second area 707. In some embodiments, the first area 705 and the second area 707 are not on opposite sides of the ring resonator 105 so that a first path 709 between them within the ring resonator 105 is shorter than a second path 711. These geometric relationships facilitate realizing certain nonlinear optical effects.

Figure 8A:
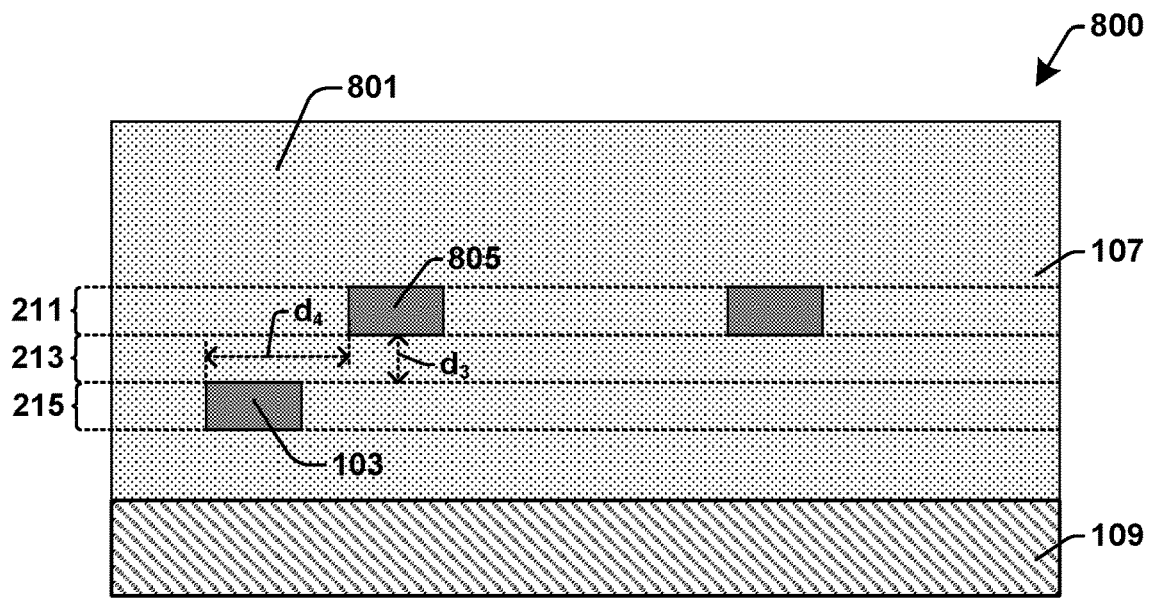
FIGS. 8A-8B illustrate cross-sectional side and plan views of a PIC device according to some embodiments.
Figure 8B:
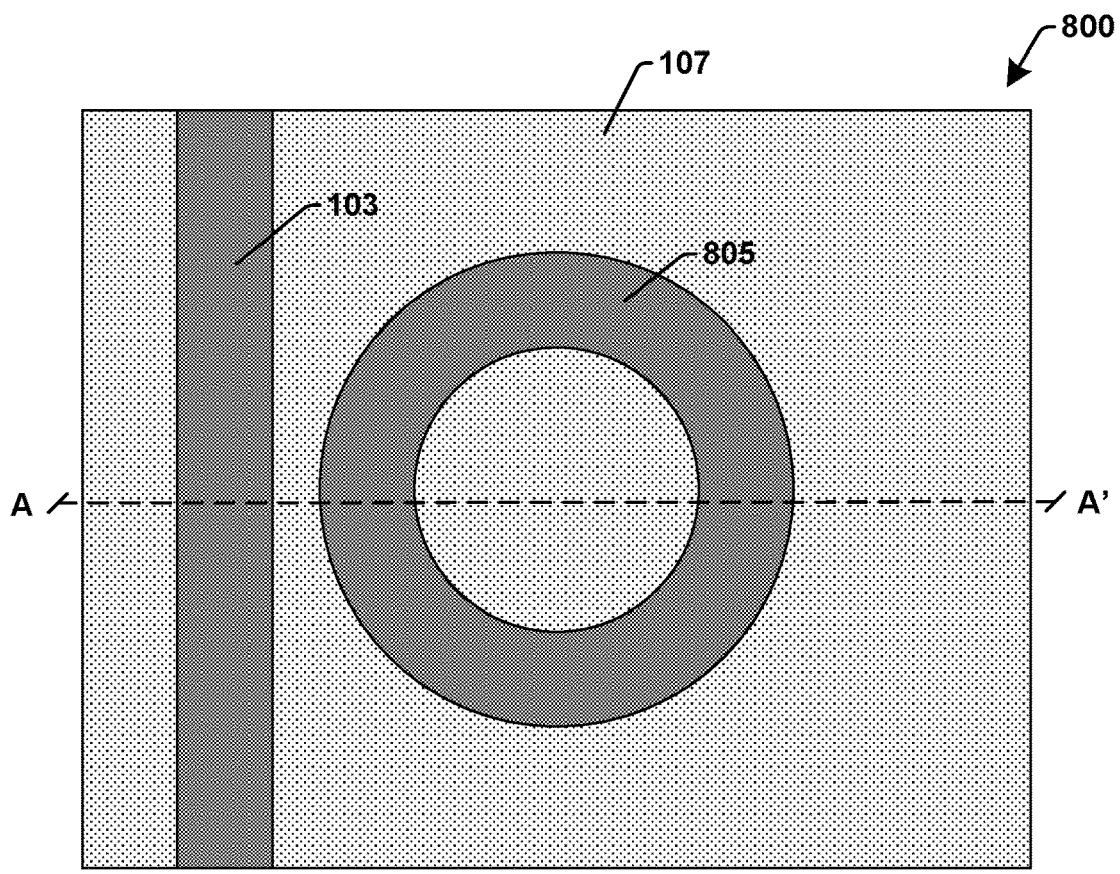

FIGS. 8A and 8B illustrate cross-sectional and plan views of a PIC device 800 which includes a PIC 801. The PIC 801 is like the PIC 401 of FIGS. 4A-4B except that in the PIC 801 the ring resonator 105 is replaced by a ring resonator 805. The ring resonator 805 differs from the ring resonator 105 in that the ring resonator 805 is made of an ordinary optical material. This embodiment emphasizes that using vertical spacing of the distance $d_3$, especially in combination with the lateral spacing of the distance $d_4$, provides the advantage of better control over the degree of coupling regardless of whether the ring resonator or like device is composed of a nonlinear optical material.

Figure 9:
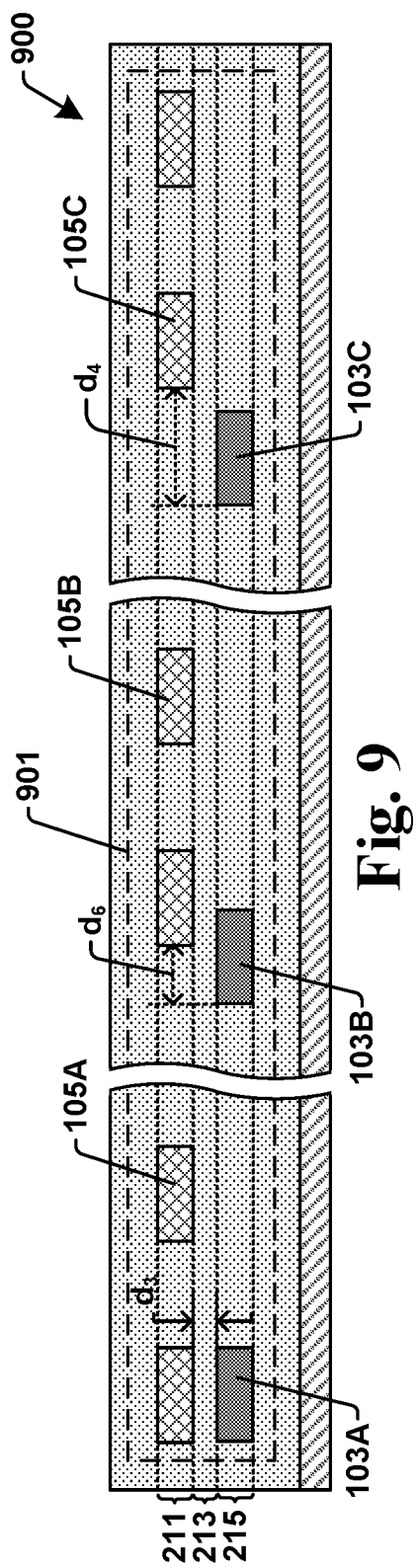
FIG. 9 illustrates a cross-sectional side view of a PIC device according to some embodiments.

FIG. 9 illustrates a cross-sectional view of a PIC device 900 which includes a PIC 901. In accordance with some embodiments, the PIC 901 includes a plurality of device pairs each with one member in a first device layer 215 and another member in a second device layer 211, wherein the first device layer 215 and the second device layer 211 are separated by a cladding layer 213. The devices in the first device layer 215 are vertically offset from the devices in the second device layer 211 by the distance $d_3$, which is the thickness of the cladding layer 213.

The first ring resonator 105A has no lateral offset with respect to the first waveguide 103A. The second ring resonator 105B has a lateral offset of distance do with respect to the second waveguide 103B. The third ring resonator 105C has a lateral offset of distance $d_4$ with respect to the third waveguide 103C. These three device pairs may have varying degrees of coupling. For example, the first device pair may be over coupled, the second device pair may be critically coupled, and the third device pair may be under coupled. While it may not be possible to set these various coupling conditions by means of the thickness of the cladding layer 213 alone, the vertical offset provided by the cladding layer 213 allows these various coupling conditions to be achieved more reliably using lateral offset.

Figure 10A:
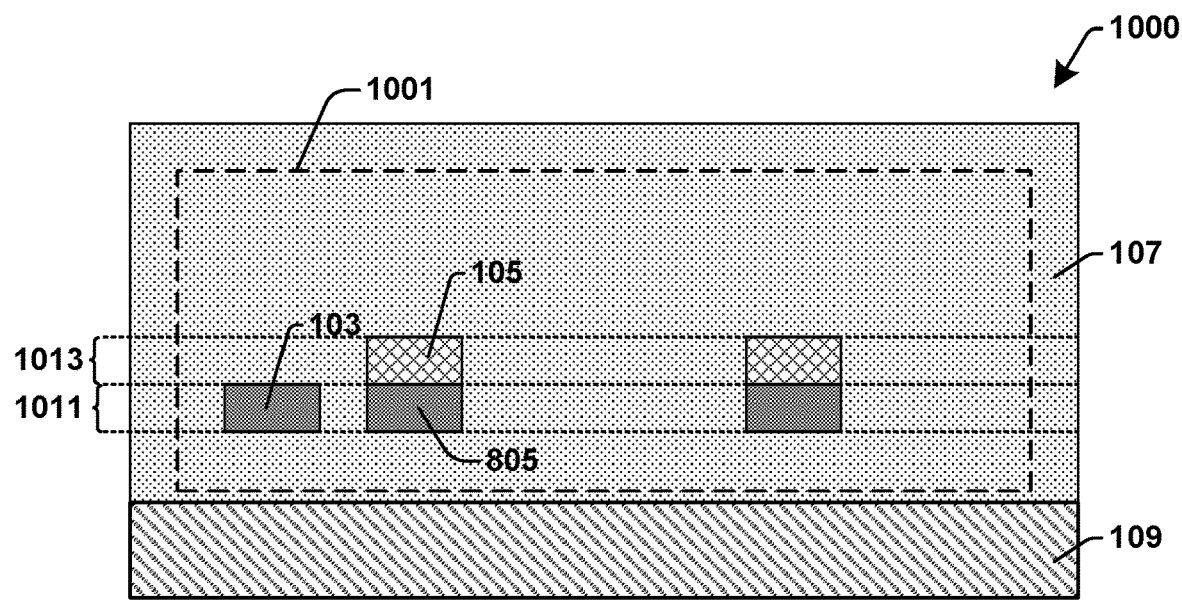
FIGS. 10A-10B illustrate cross-sectional side and plan views of a PIC device according to some other embodiments.
Figure 10B:
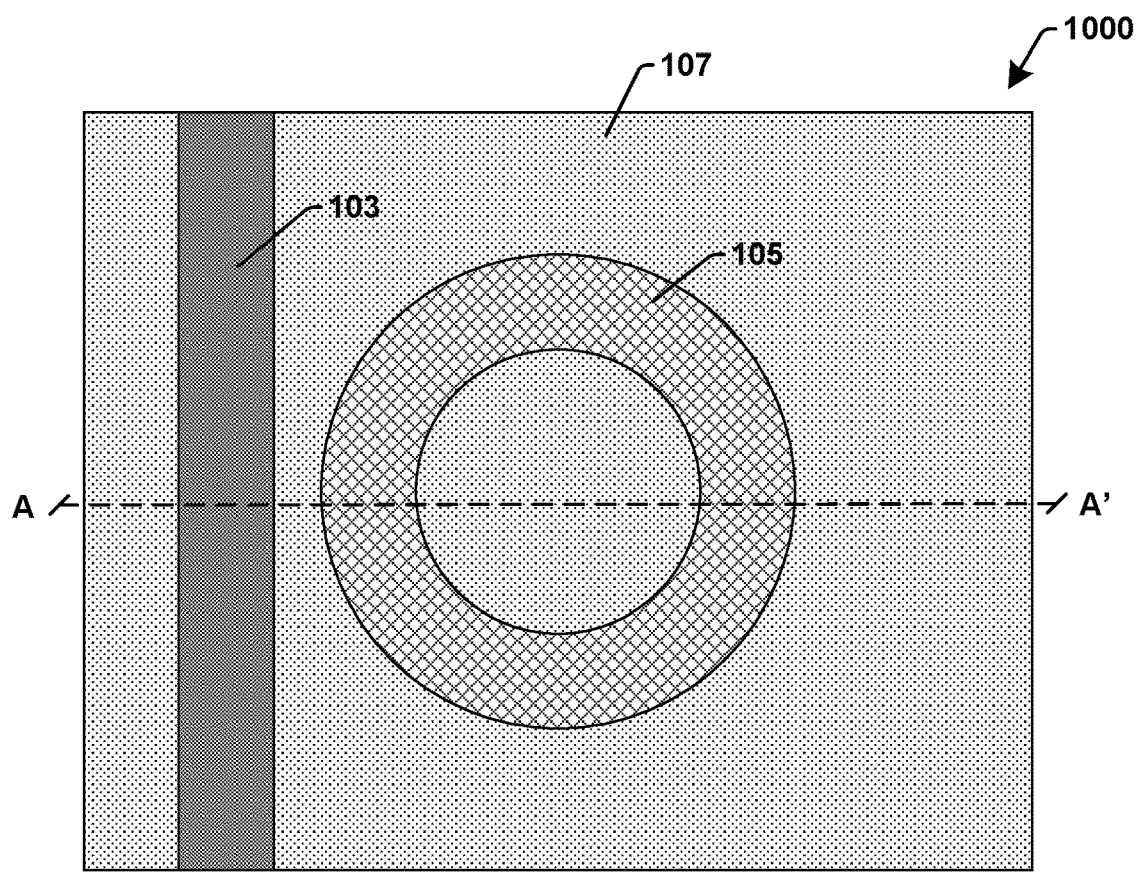

FIGS. 10A and 10B illustrate cross-sectional and plan views of a PIC device 1000 which includes a PIC 1001. The PIC 1001 is like the PIC 401 of FIGS. 4A-4B except that in the PIC 601 the waveguide 103 need not be directly coupled to the ring resonator 105. Instead, the waveguide 103 may be coupled to the ring resonator 105 through the ring resonator 805. The ring resonator 805 is composed of an ordinary optical material. In some embodiments, the ring resonator 805 is in a first layer 1011 along with the waveguide 103. The ring resonator 105 is in a second layer 1013 that is above the first layer 1011. The ring resonator 105 is directly over the ring resonator 805. In some embodiments, the ring resonator 105 is in direct contact with the ring resonator 805. The ring resonator 805 may couple more strongly with the waveguide 103 than would the ring resonator 105 in the same location. The ring resonator 805 and the ring resonator 105 cooperate to provide low losses and enhanced nonlinear effects.

Figure 11A:
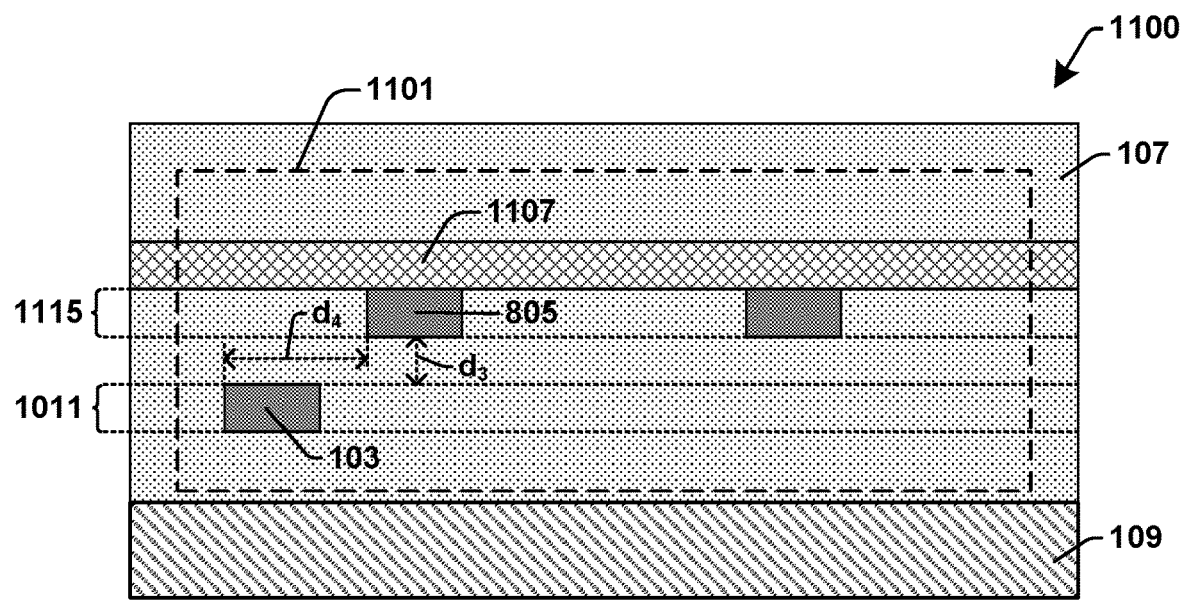
FIGS. 11A-11B illustrate cross-sectional side and plan views of a PIC device according to some other embodiments.
Figure 11B:
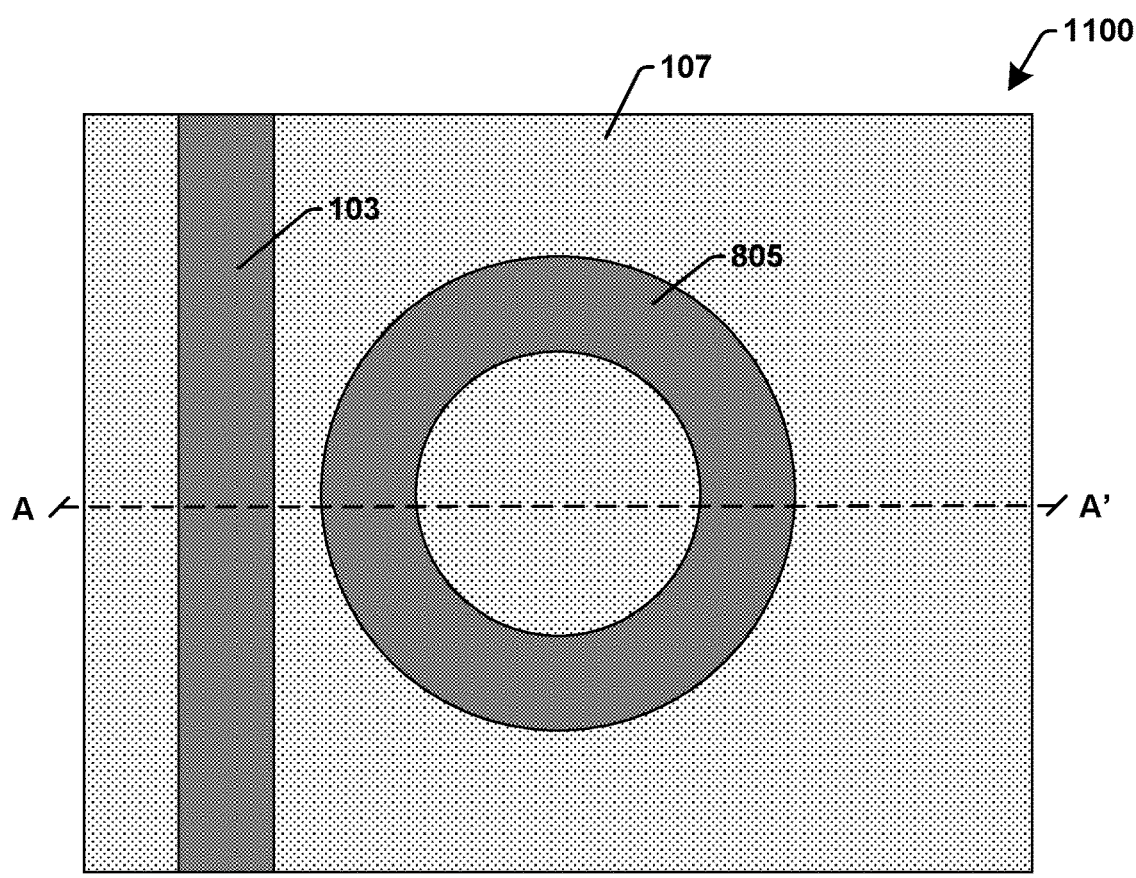

FIGS. 11A and 11B illustrate cross-sectional and plan views of a PIC device 1100 which includes a PIC 1101. The PIC 1101 is like the PIC 1001 of FIGS. 10A-10B except that the PIC 1101 uses a nonlinear optical layer 1107 made of a nonlinear optical material in place of the ring resonator 105. The nonlinear optical layer 1107 and the ring resonator 805 together form a resonator that provides nonlinear effects using a structure similar to a rib waveguide. The ring resonator 805 is in a second layer 1115 that is above the first layer 1011 so that the nonlinear optical layer 1107 is not directly coupled to the waveguide 103. The nonlinear optical layer 1107 may be connected in parallel within the PIC 1001. The ring resonator 805 is illustrated as having a lateral offset of distance da and a vertical offset $d_3$ from the waveguide 103. In some embodiments, the lateral offset $d_4$ is eliminated so that the ring resonator 805 is directly over the waveguide 103. In some embodiments, the vertical offset $d_3$ is eliminated so that the second layer 1115 immediately above the first layer 1011.

Figure 12A:
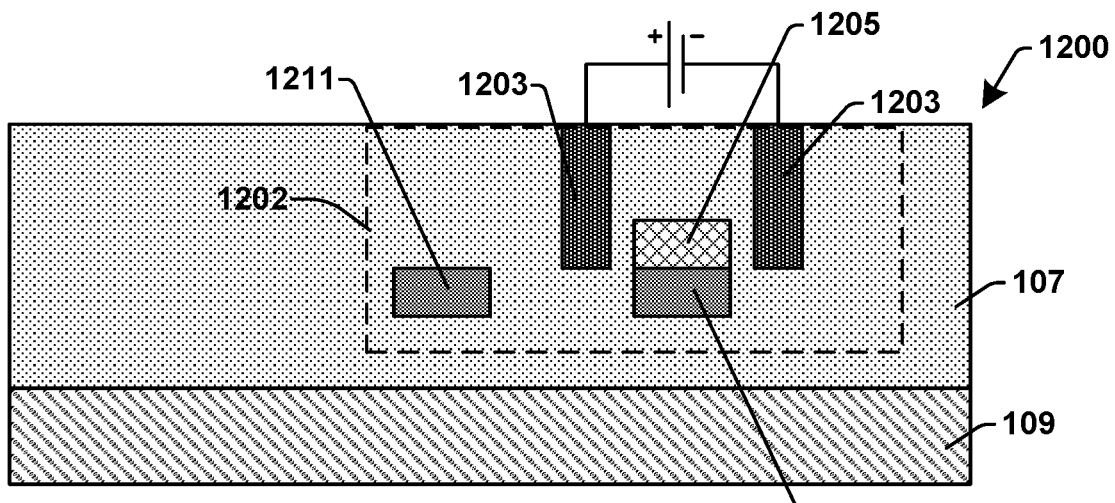
FIGS. 12A-12B illustrate cross-sectional side and plan views of a PIC device according to some other embodiments.
Figure 12B:
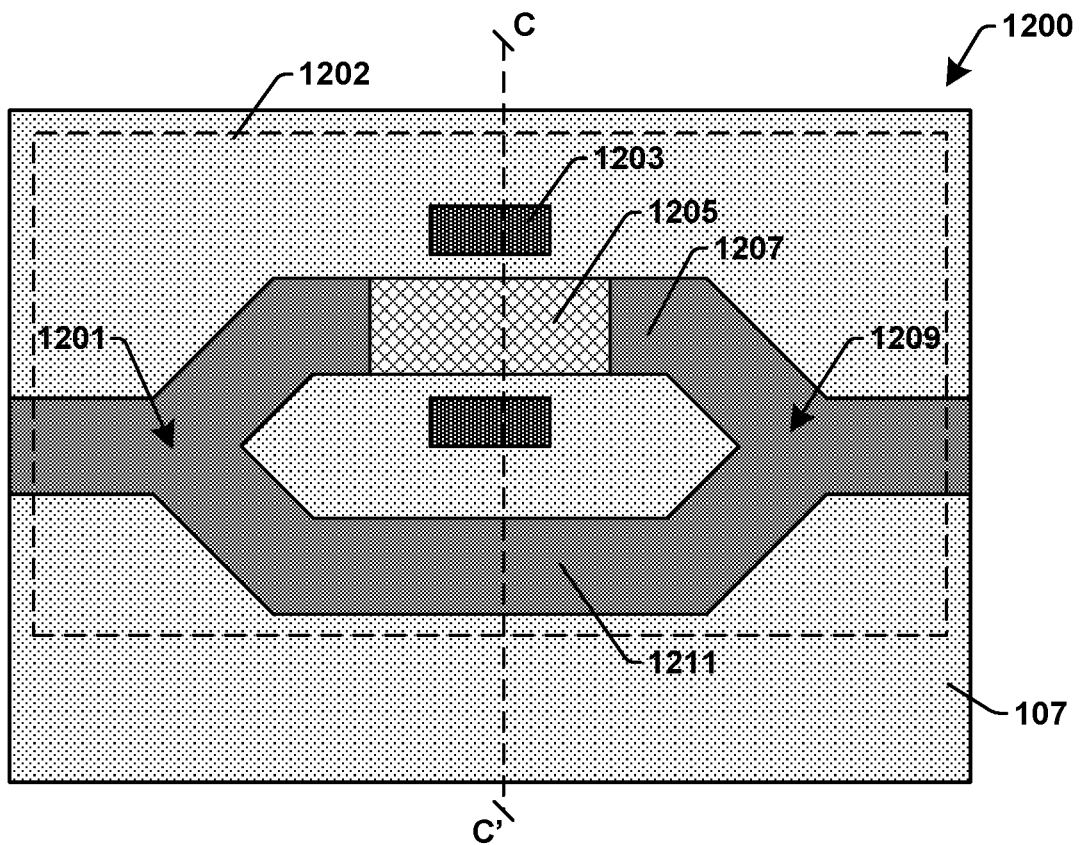

FIGS. 12A and 12B illustrate cross-sectional and plan views of a PIC device 1200 which includes a Mach-Zehnder interferometer (MZI) 1202. The MZI 1202 includes first beam splitter 1201, second beam splitter 1209, first arm 1207, and second arm 1211, which are photonic devices made of ordinary optical material. The first arm 1207 and the second arm 1211 are waveguides. A nonlinear waveguide 1205 made of a nonlinear optical material is directly over and connected in parallel with the first arm 1207. In some embodiments, the nonlinear waveguide 1205 is in direct contact with the first arm 1207. Electrodes 1203 are positioned to selectively apply an electric field to the nonlinear waveguide 1205.

The first arm 1207 and the second arm 1211 may be composed of the same material and may have equal length so as to balance their transmission rates. The nonlinear waveguide 1205 may vary a rate of transmission through the first arm 1207 by an amount that depends on the refractive index of the nonlinear waveguide 1205. The refractive index of the nonlinear waveguide 1205 may be controlled through the electrode 1203 thanks to the Pockels effect.

FIGS. 13-22 are cross-sectional view illustrations exemplifying a method according to the present disclosure of forming a PIC with ordinary and nonlinear optical materials. While FIGS. 13-22 are described with reference to various embodiments of a method, it will be appreciated that the structures shown in FIGS. 13-22 are not limited to the method but rather may stand alone separate from the method. FIGS. 13-22 are described as a series of acts. The order of these acts may be altered in other embodiments. While FIGS. 13-22 illustrate and describe a specific set of acts, some may be omitted in other embodiments. Further, acts that are not illustrated and/or described may be included in other embodiments.

Figure 13:
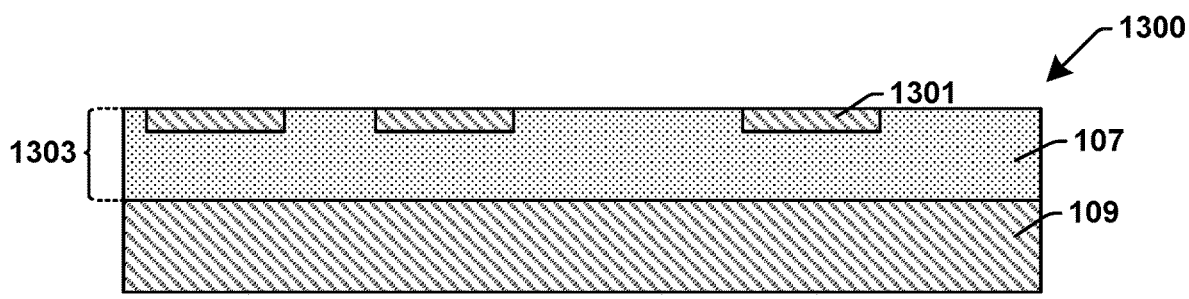
FIGS. 13-22 are a series of cross-sectional view illustrations exemplifying a method of forming a PIC device according to some embodiments.

As shown by the cross-sectional view 1300 of FIG. 13, the method may begin with depositing a layer 1303 of cladding 107 over the substrate 109. The cladding 107 may be deposited by any suitable process. Processes that may be suitable include chemical vapor deposition (CVD), physical vapor deposition (PVD), and the like. In some embodiments, waveguides 1301 and other photonic devices are formed within the layer 1303. In some embodiments, the waveguides 1301 and other photonic devices are formed of silicon (Si), the like, or some other ordinary optical material distinct from the ordinary optical material used to form the waveguide 103 (see FIG. 15). Silicon (Si) or the like may be more suitable than silicon nitride (SiN) or the like for active photonic devices such as phase shifters and photodetectors. The waveguides 1301 and other photonic devices may be formed by depositing a layer of silicon followed by masking, etching, epitaxial growth, ion implantation, epitaxial growth, the like, and other such processing.

Figure 14:
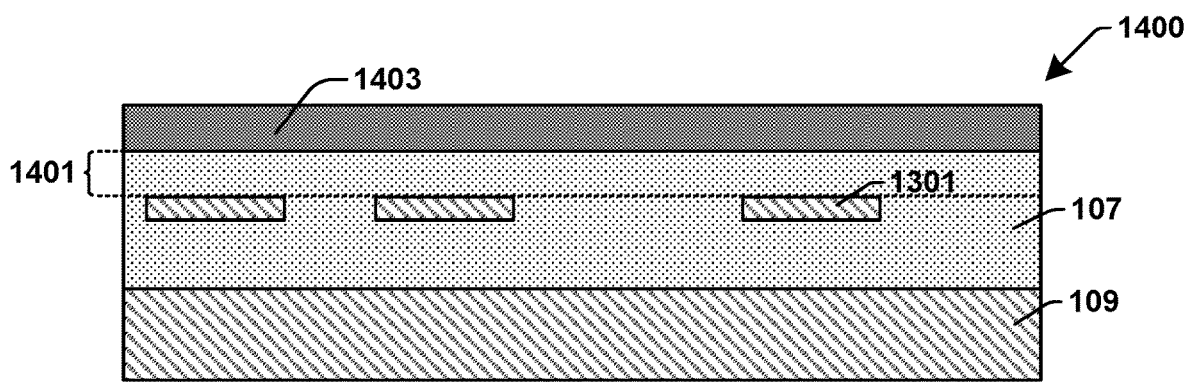

As shown by the cross-sectional view 1400 of FIG. 14, an additional layer 1401 of the cladding 107 may be deposited followed by a layer 1403 of an ordinary optical material such as silicon nitride (SiN) or the like. The layer 1403 may be deposited by CVD, PVD, atomic layer deposition (ALD), the like, or any other suitable process.

Figure 15:
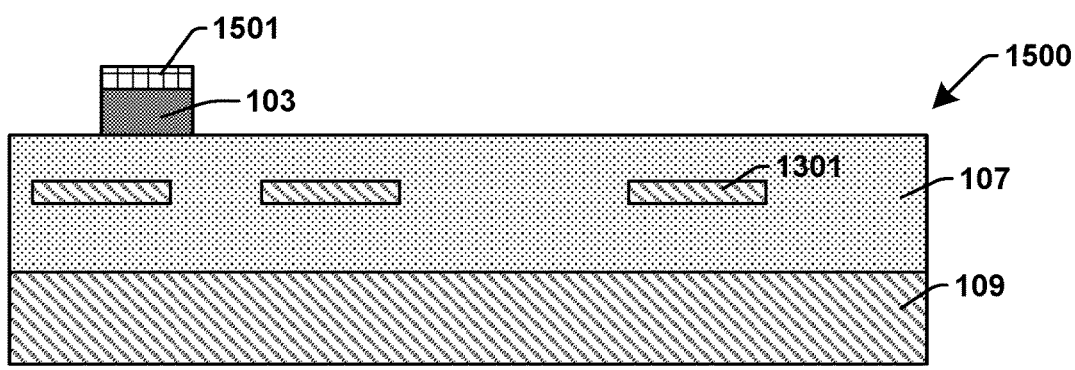

As shown by the cross-sectional view 1500 of FIG. 15, the layer 1403 may be patterned to form the waveguide 103. A mask 1501 may be used. The mask 1501 may be patterned by E-beam lithography, photolithography, the like, or any other suitable process. The layer 1403 may be etched through openings in the mask 1501 by plasma etching, the like, or any other suitable process.

Figure 16:
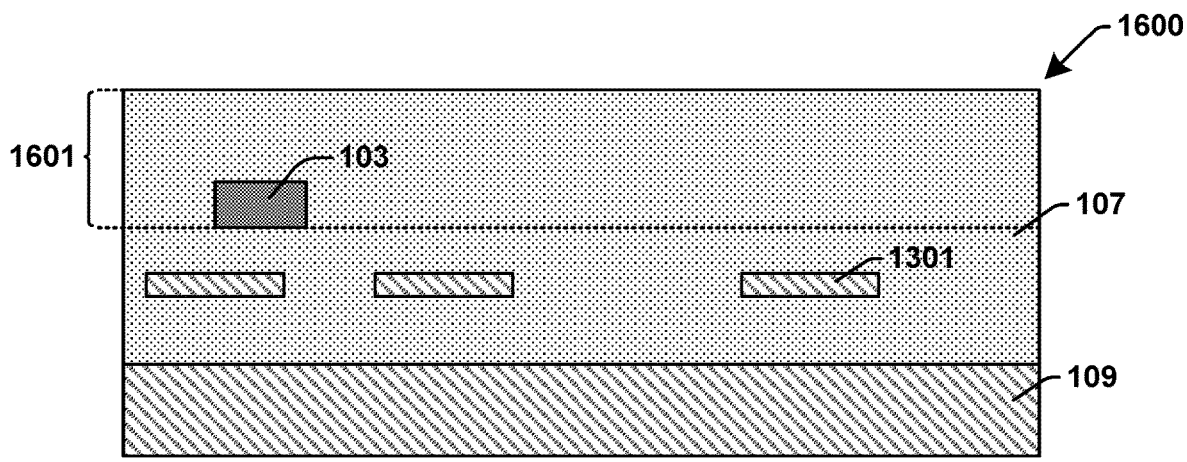

As shown by the cross-sectional view 1600 of FIG. 16, an additional layer 1601 of the cladding 107 may be deposited over the structure illustrated by the cross-sectional view 1500 of FIG. 15. The additional layer 1601 may be deposited by CVD, PVD, ALD, the like, or any other suitable process. The deposition may be followed by planarization. Planarization may be by chemical mechanical polishing (CMP), the like, or any other suitable process.

Figure 17:
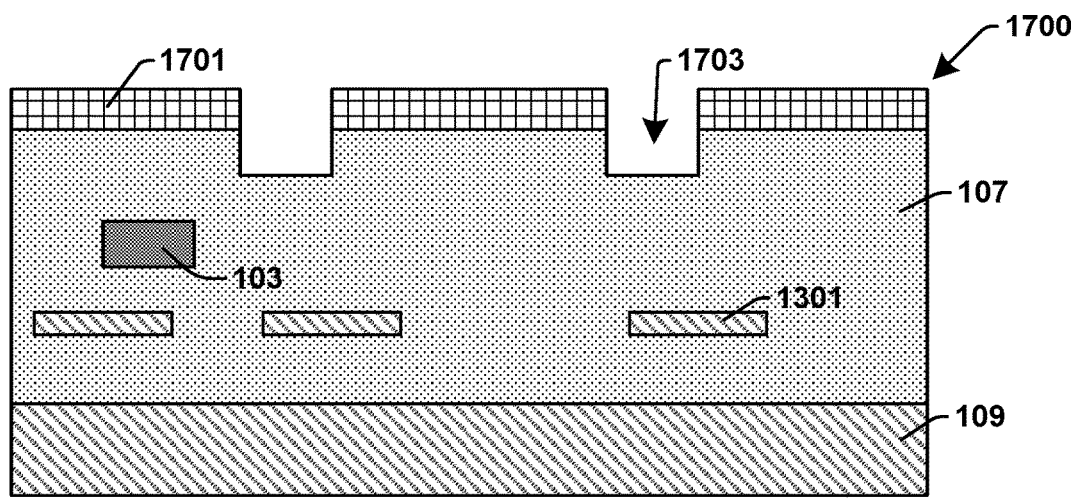

As shown by the cross-sectional view 1700 of FIG. 17, a mask 1701 may be formed, patterned, and used to etch a trench 1703 in the cladding 107. The patterning process may be E-beam lithography, photolithography, the like, or any other suitable process. The etch process may be plasma etching, the like, or any other suitable process. The trench 1703 forms a closed loop suitable for a ring resonator. Closed loop shapes suitable for a ring resonator include ring shapes, oval shapes, racetrack shapes, and the like.

Figure 18:
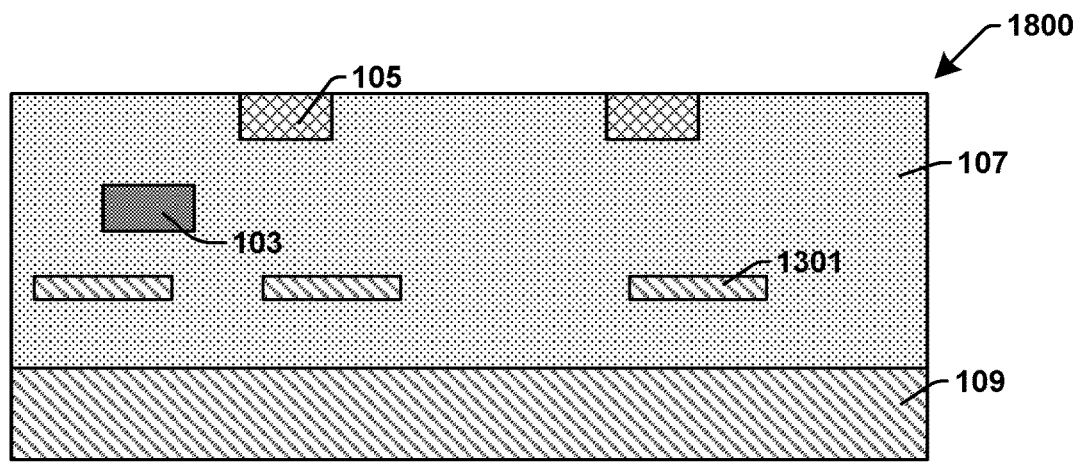

As shown by the cross-sectional view 1800 of FIG. 18, a nonlinear optical material may be used to fill the trench 1703 and form the ring resonator 105. The deposition process may be CVD. PVD. ALD, the like, or any other suitable process. Deposition may be followed by planarization by CMP, the like, or any other suitable planarization process.

Figure 19:
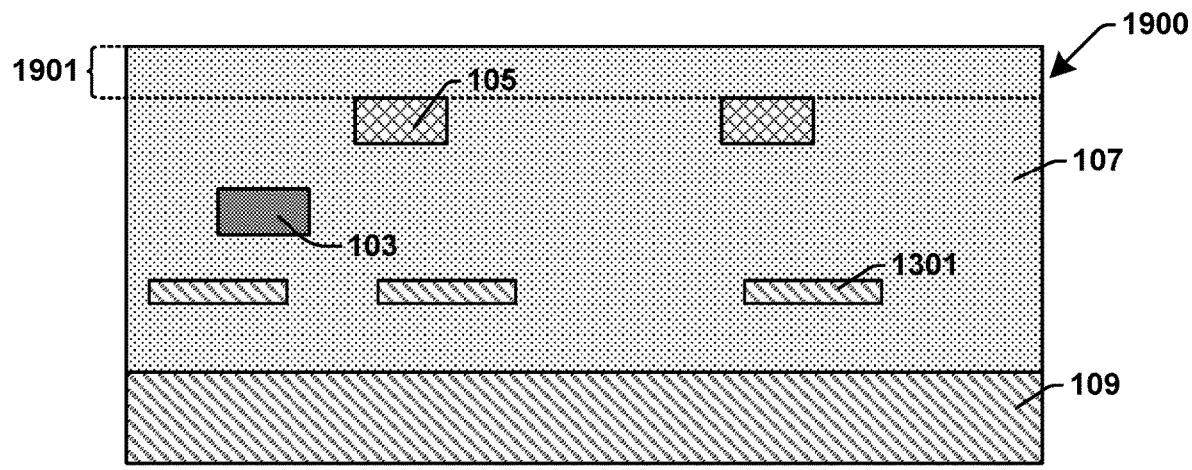

As shown by the cross-sectional view 1900 of FIG. 19, an additional layer 1901 of the cladding 107 may be deposited over the structure shown by the cross-sectional view 1800 of FIG. 18. The additional layer 1901 may be deposited by CVD, PVD, ALD, the like, or any other suitable process.

Figure 20:
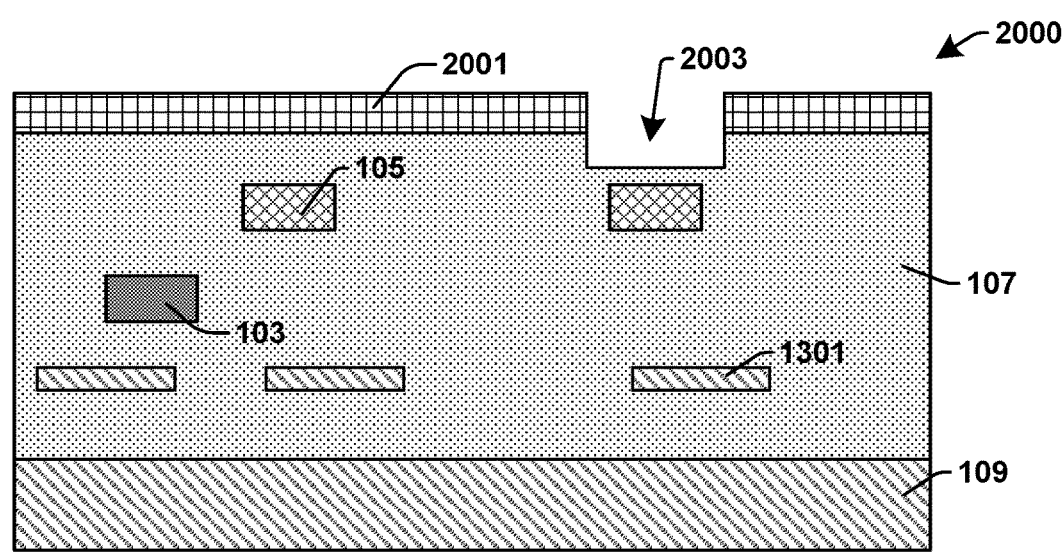

As shown by the cross-sectional view 2000 of FIG. 20, a mask 2001 may be formed, patterned, and used to etch a trench 2003 in the cladding 107. The patterning process may be E-beam lithography, photolithography, the like, or any other suitable process. The etch process may be plasma etching, the like, or any other suitable process.

Figure 21:
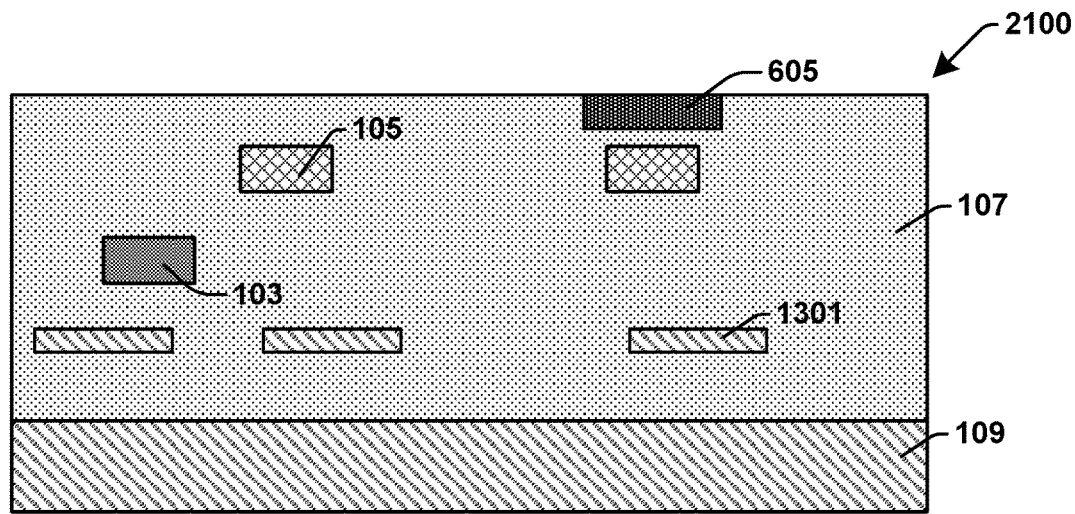

As shown by the cross-sectional view 2100 of FIG. 21, a conductive material may be used to fill the trench 2003 and form the heating element 605. The conductive material may be a metal, polysilicon, graphene, the like, or any other suitable material. In some embodiments, the conductive material is a metal. The deposition process may be CVD, PVD, ALD, electroplating, electroless plating, the like, or any other suitable process. Deposition may be followed by planarization by CMP or the like.

Figure 22:
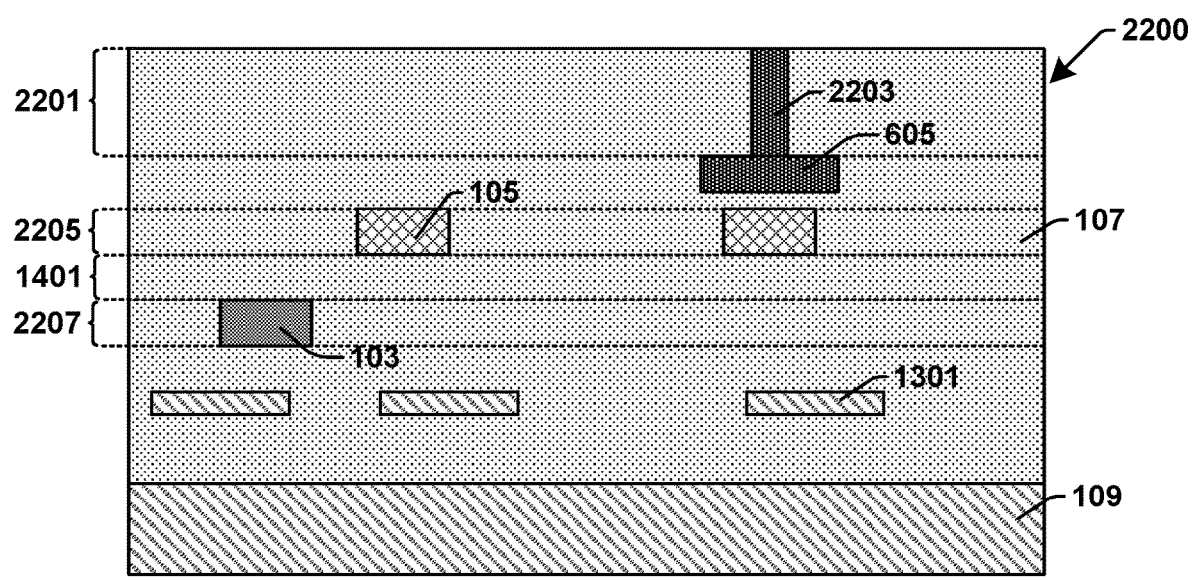

As shown by the cross-sectional view 2200 of FIG. 22, an additional layer 2201 of the cladding 107 or some other dielectric material may be deposited. A hole may be etched through the additional layer 2201 and filled to form a via 2203 that connects to the heating element 605.

FIGS. 13-22 illustrate a process in which the additional layer 1401 (see FIGS. 14 and 22) of the cladding 107 is formed to create vertical separation between a first layer 2207 that contains devices of an ordinary optical and a second layer 2205 that contains devices of a nonlinear optical material. FIGS. 23-36 are cross-sectional view illustrations exemplifying another process which differs, among other ways, in that the second layer which contains devices of a nonlinear optical material is formed in direct contact with the first layer that contains devices of an ordinary optical material. The process of FIGS. 23-36 produces a 3D integrated circuit (IC) device including a PIC. It will be appreciated that the same processing may be applied to other structures of the present disclosure to produce other 3D IC devices.

Figure 23:
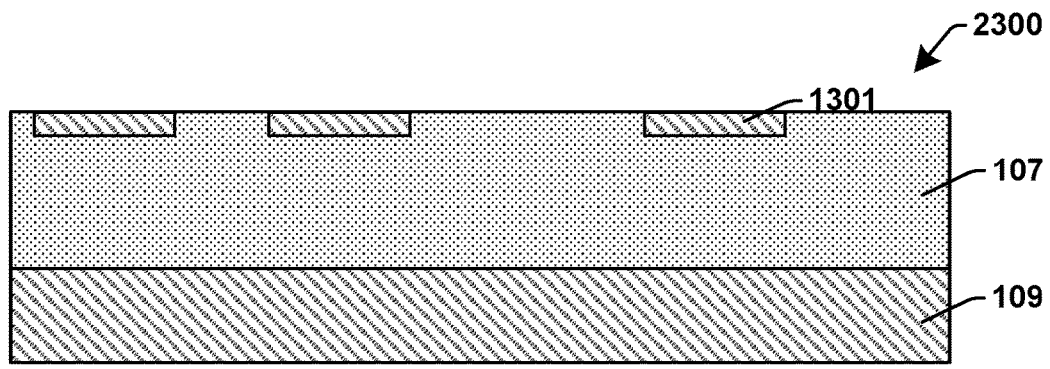
FIGS. 23-36 are a series of cross-sectional view illustrations exemplifying a method of forming a PIC device according to some other embodiments.

As shown by the cross-sectional view 2300 of FIG. 23, the method may begin with a structure similar to the one shown by the cross-sectional view 1300 of FIG. 13. The cladding 107 of the cross-sectional view 2300 may be thicker than the cladding 107 of the cross-sectional view 1300 of FIG. 13.

Figure 24:
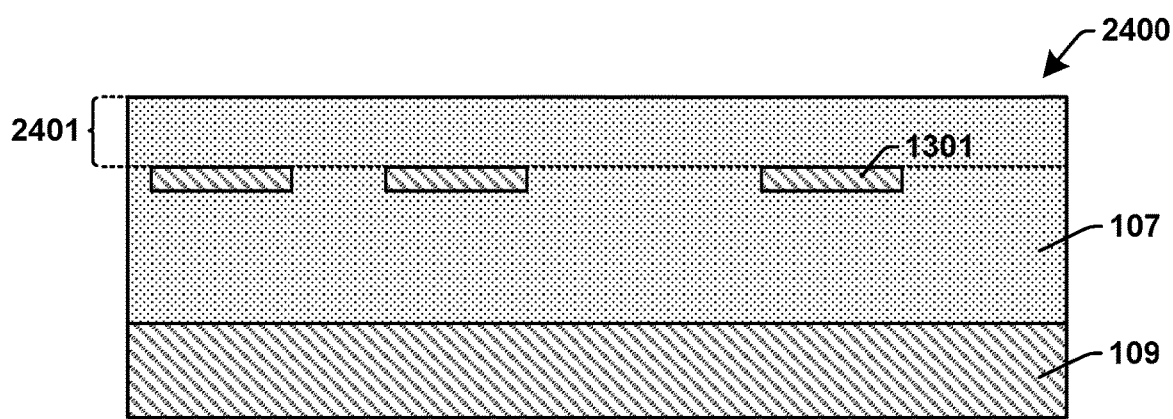

As shown by the cross-sectional view 2400 of FIG. 24, the method may continue with depositing an additional layer 2401 of cladding 107 over the structure shown by the cross-sectional view 2300 of FIG. 23. The additional layer 2401 may be deposited by CVD, PVD, ALD, the like, or any other suitable process.

Figure 25:
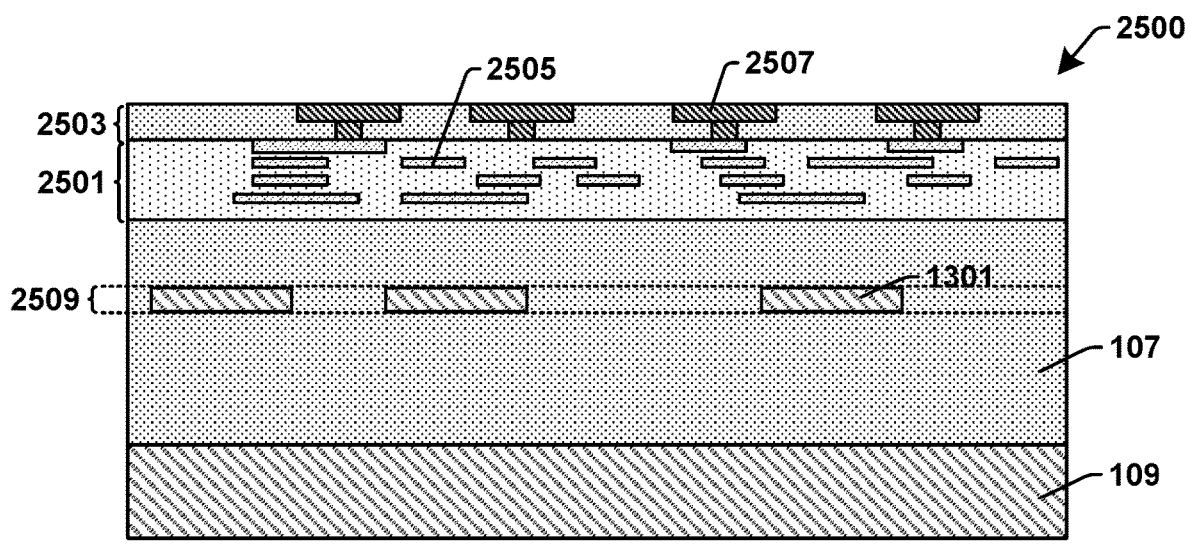

As shown by the cross-sectional view 2500 of FIG. 25, additional layers may be added to the structure shown by the cross-sectional view 2400 of FIG. 24. These layers may include a metal interconnect structure 2501 comprising wires 2505, and a bonding structure 2503 that includes bond pads 2507. Electrical connections (not shown) may be formed between photonic devices in the layer 2509 that includes the waveguides 1301 and the metal interconnect structure 2501.

Figure 26:
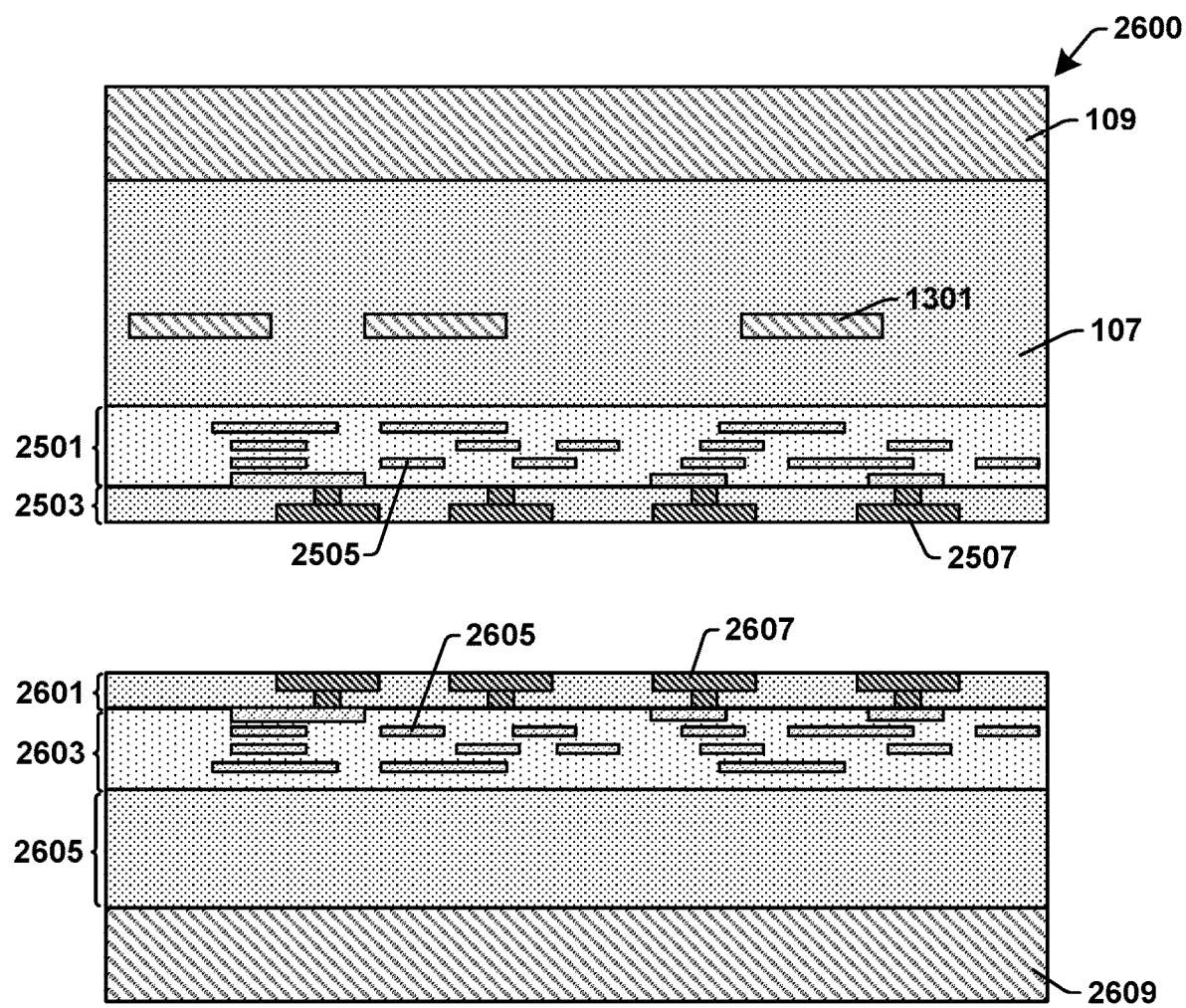

As shown by the cross-sectional view 2600 of FIG. 26, the substrate 109 may be inverted and aligned to a second substrate 2609. A bonding structure 2601 including bond pads 2607 is disposed over the second substrate 2609. Additional structures may also be formed on the second substrate 2609 such as a device layer 2605 and a metal interconnect layer 2603. The device layer 2605 may contain electrical devices and/or photonic devices.

Figure 27:
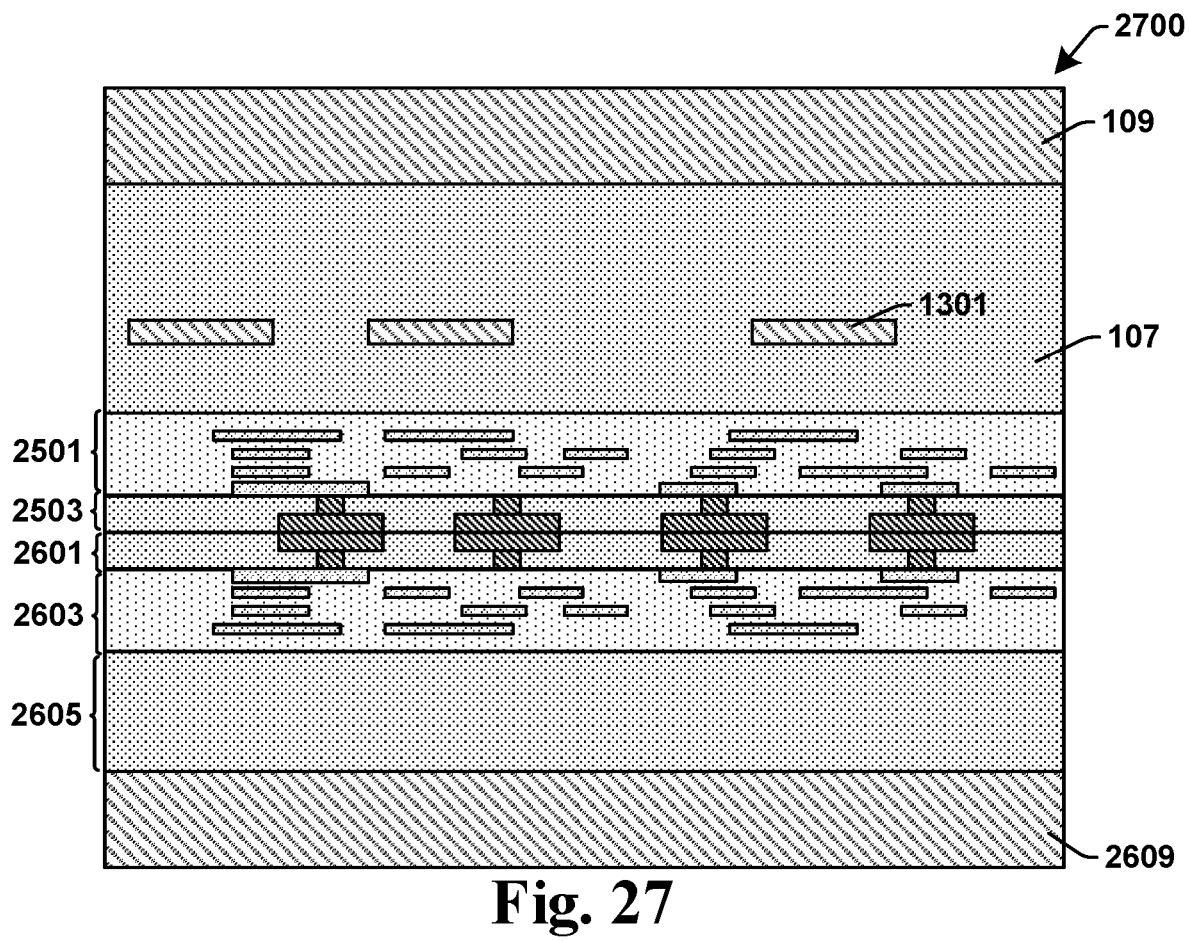

As shown by the cross-sectional view 2700 of FIG. 27, the substrate 109 may be joined to the second substrate 2609 through the bonding structure 2503 and the bonding structure 2601. The bonding process may be hybrid bonding or any other suitable bonding process. As shown by the cross-sectional view 2800 of FIG. 28 the substrate 109 may be removed by grinding, the like, or any other suitable process after the bonding process is complete.

Figure 29:
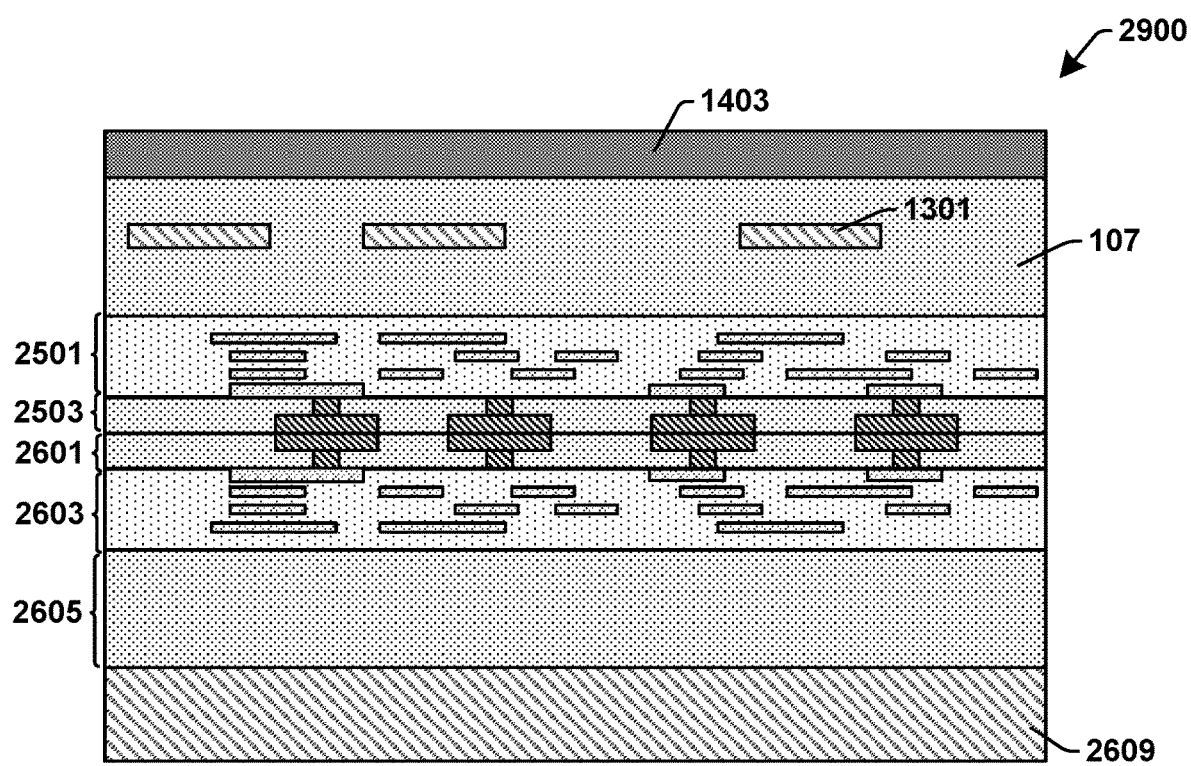

As shown by the cross-sectional view 2900 of FIG. 29, a layer 1403 or ordinary optical material may be deposited over the cladding 107 by CVD, PVD, atomic layer deposition (ALD), the like, or any other suitable process.

Figure 30:
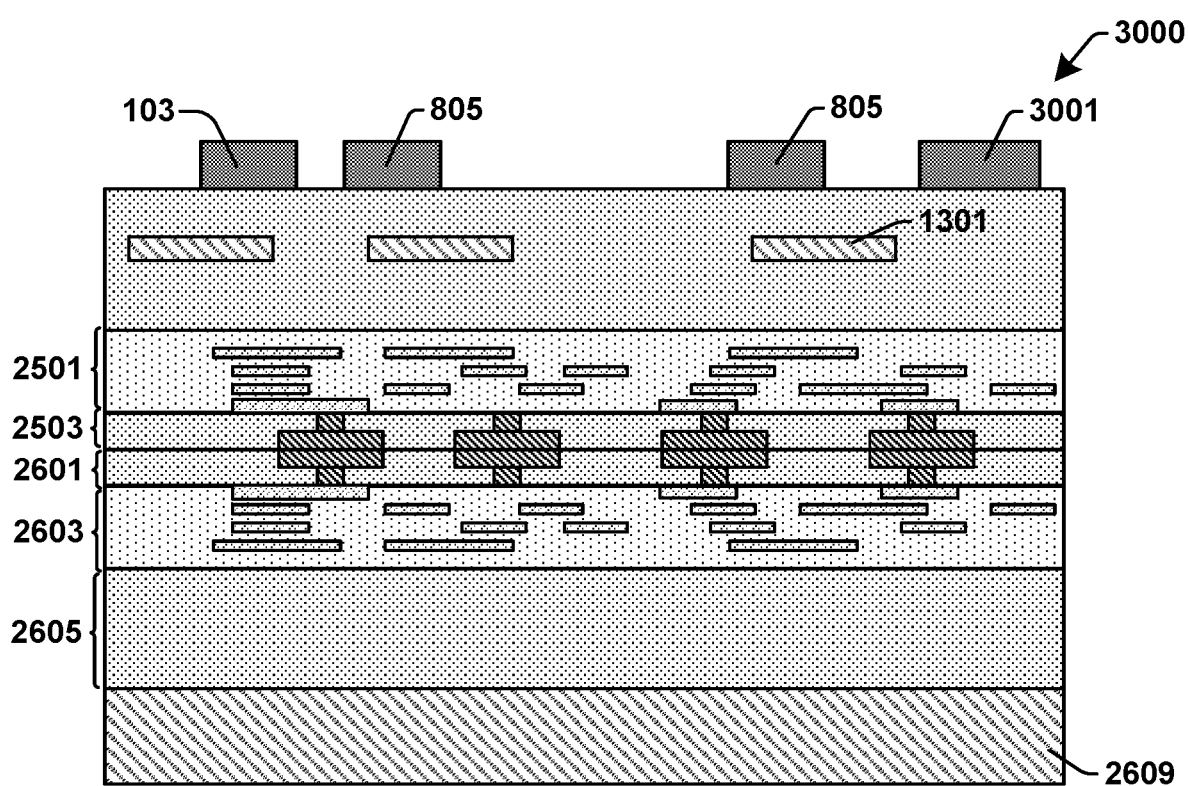

As shown by the cross-sectional view 3000 of FIG. 30, the layer 1403 may be patterned to form the waveguide 103, the ring resonator 805, and an additional photonic structure 3001 respectively. Steps of forming the waveguide 103 and the ring resonator 805 are similar to steps shown in FIG. 14-15. Forming the additional photonic structure 3001 may include further masking, etching, epitaxial growth, ion implantation, the like, and other such processing.

Figure 31:
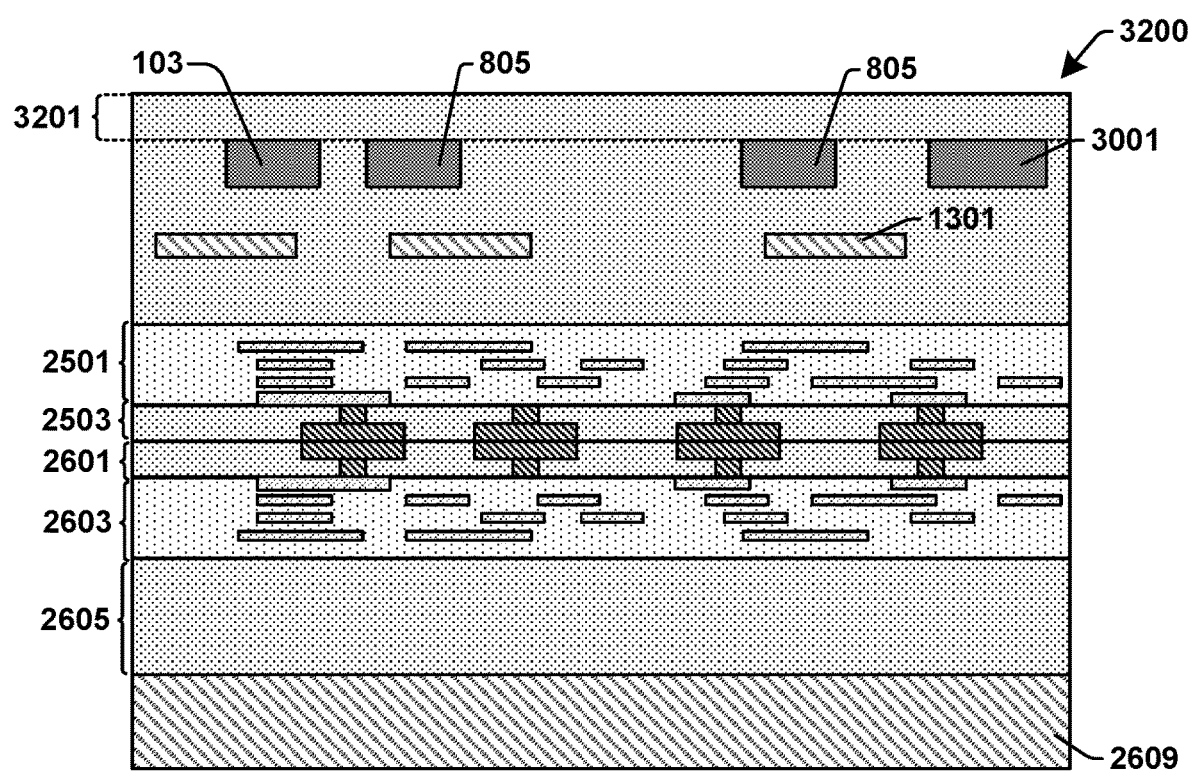

As shown by the cross-sectional view 3200 of FIG. 31, an additional layer 3201 of cladding 107 may be deposited over the structure shown by the cross-sectional view 3100 of FIG. 30. The additional layer 3201 may be deposited by CVD, PVD, ALD, the like, or any other suitable process.

Figure 32:
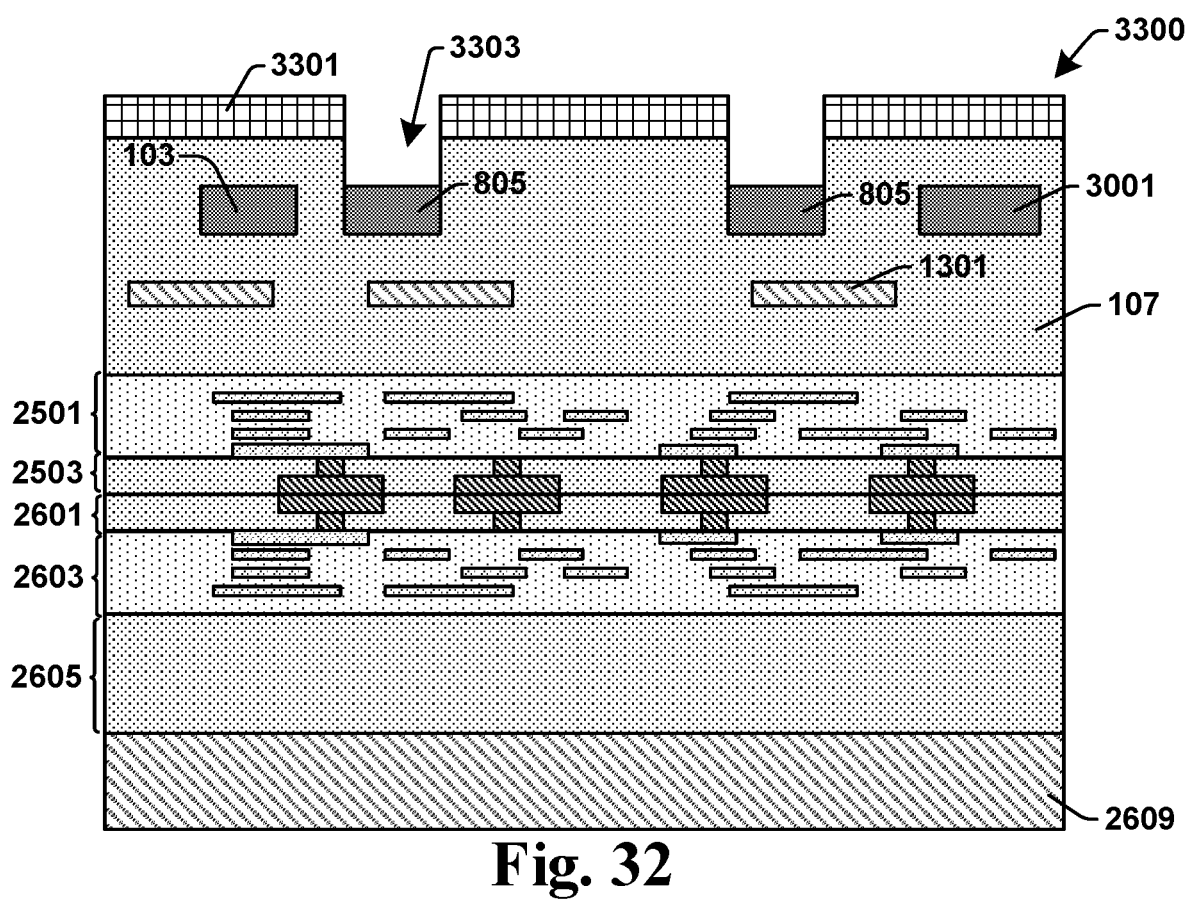

As shown by the cross-sectional view 3300 of FIG. 32, a mask 3301 may be formed, patterned, and used to etch a trench 3303 in the cladding 107. The mask 3301 may be patterned by E-beam lithography, photolithography, the like, or any other suitable process. The etch process may be plasma etching, the like, or any other suitable process. The trench 3303 may have approximately the same shape as the ring resonator 805. After patterning, the mask 3301 may be stripped.

Figure 33:
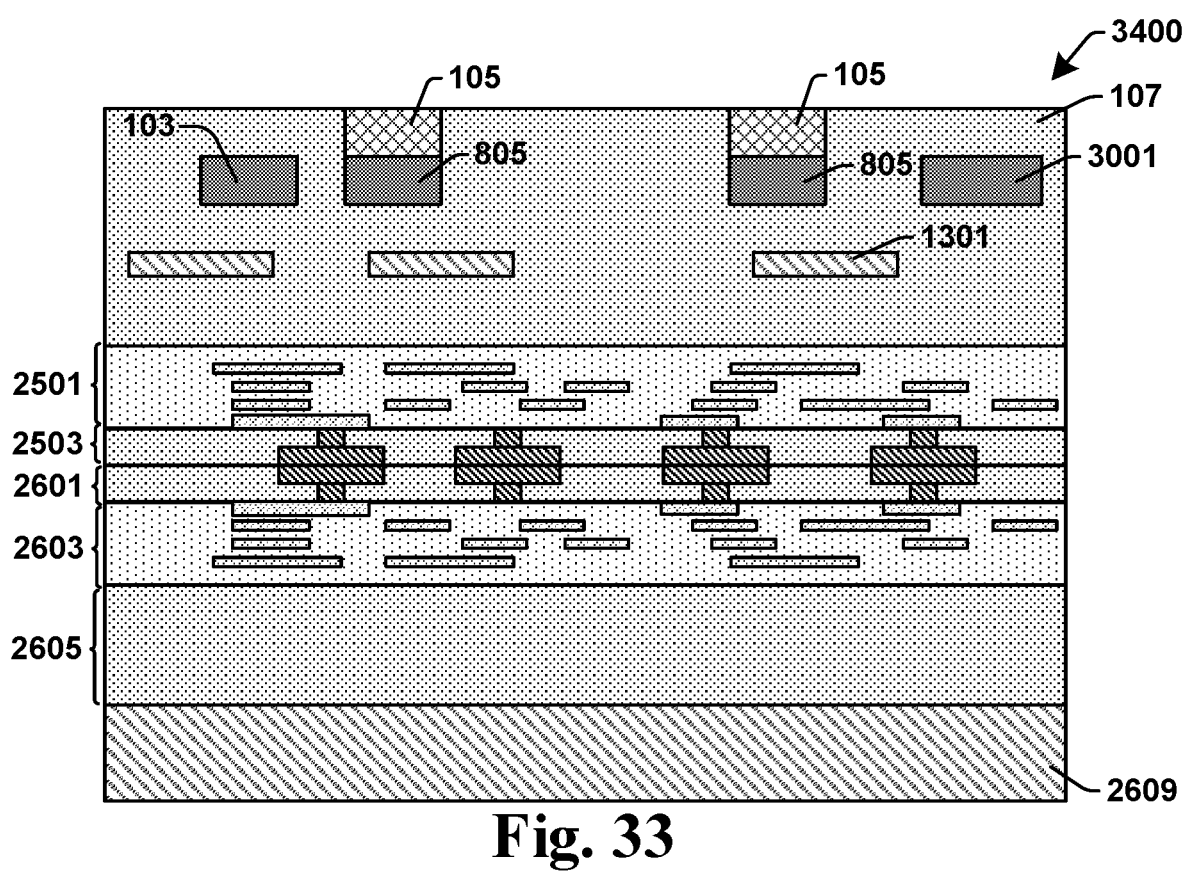

As shown by the cross-sectional view 3400 of FIG. 33, a nonlinear optical material may be used to fill the trench 3303 and form the ring resonator 105. The deposition process may be CVD. PVD, ALD, the like, or any other suitable process. Deposition may be followed by planarization by CMP, the like, or any other suitable process.

Figure 34:
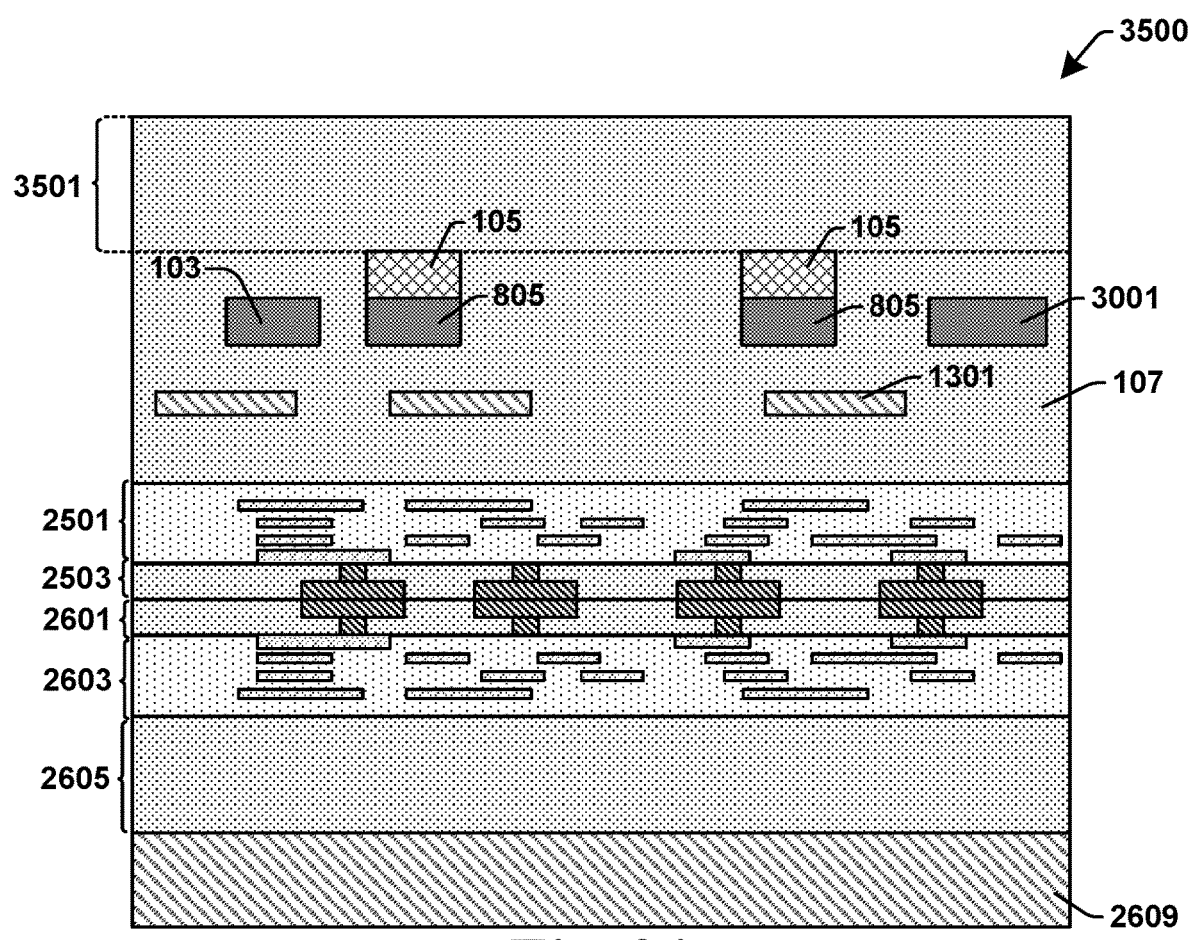

As shown by the cross-sectional view 3500 of FIG. 34, an additional layer 3501 of cladding 107 and or other dielectrics may be deposited over the structure shown by the cross-sectional view 3400 of FIG. 33. The additional layer 3501 may be deposited by CVD, PVD, ALD, the like, or any other suitable process.

Figure 35:
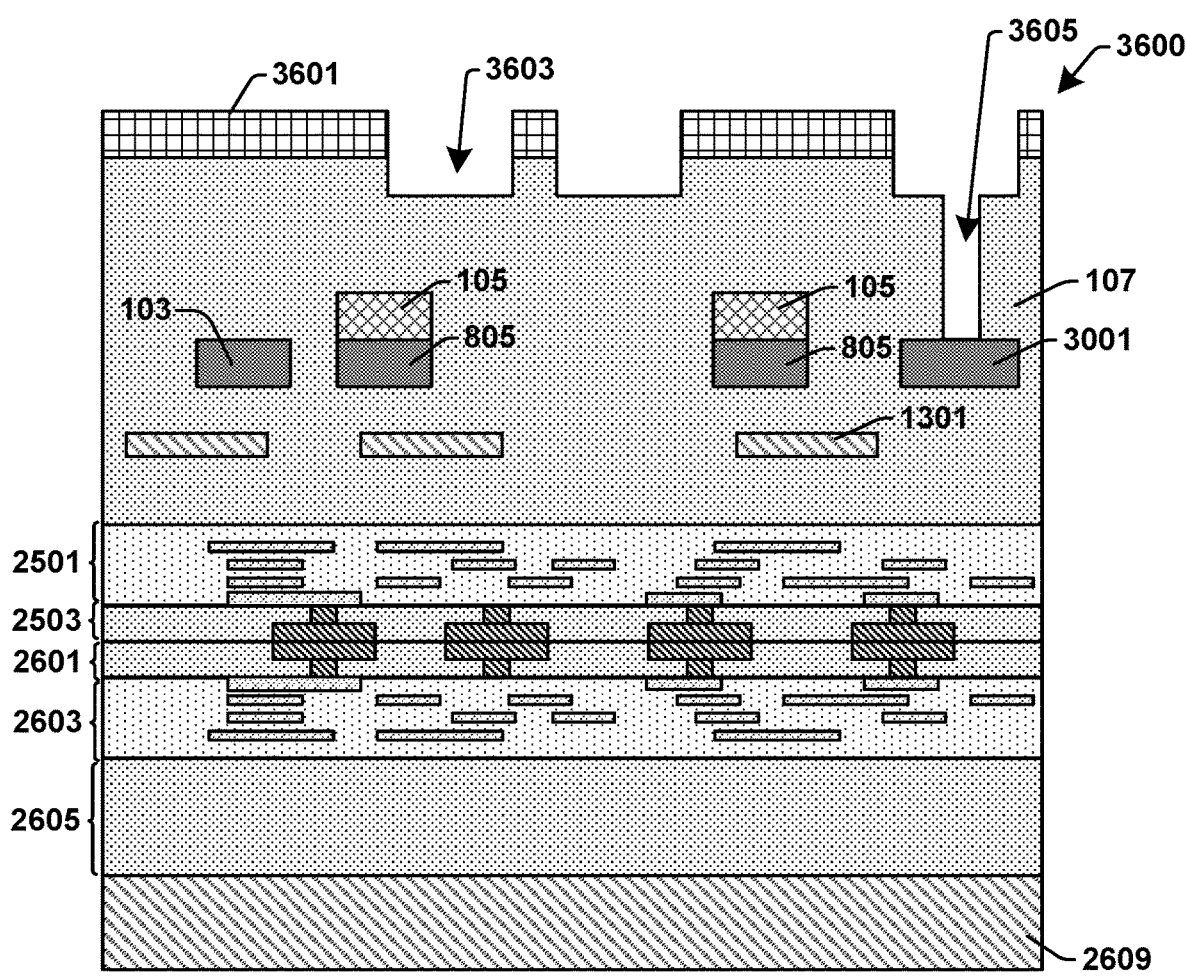

As shown by the cross-sectional view 3600 of FIG. 35, a mask 3601 may be formed and used to etch trenches 3603 in the cladding 107. An additional mask (not shown) may be formed and used to etch a hole 3605 within one of the trenches 3603 to expose an electrode of the additional photonic structure 3001.

Figure 36:
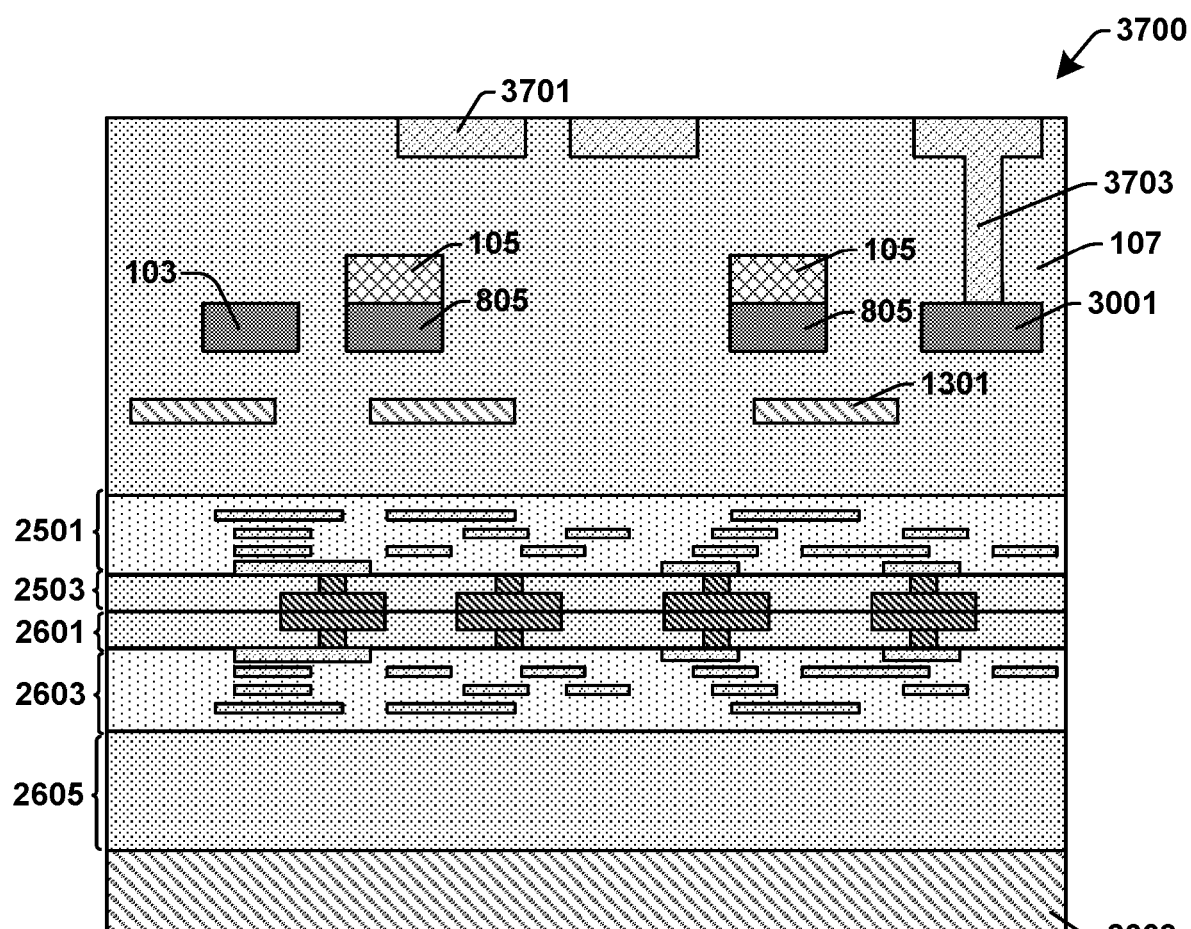
Figure 37:
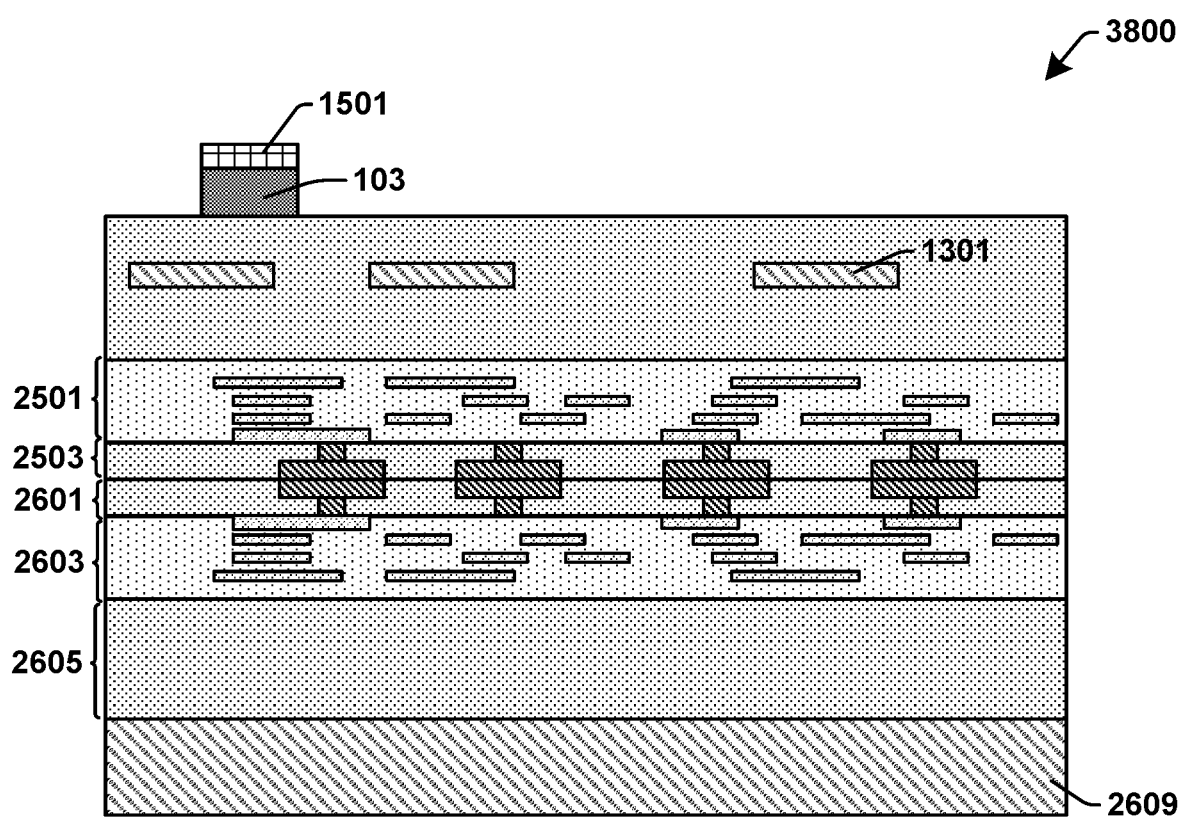
FIGS. 37-46 are a series of cross-sectional view illustrations exemplifying a method of forming a PIC device according to some other embodiments.
Figure 38:
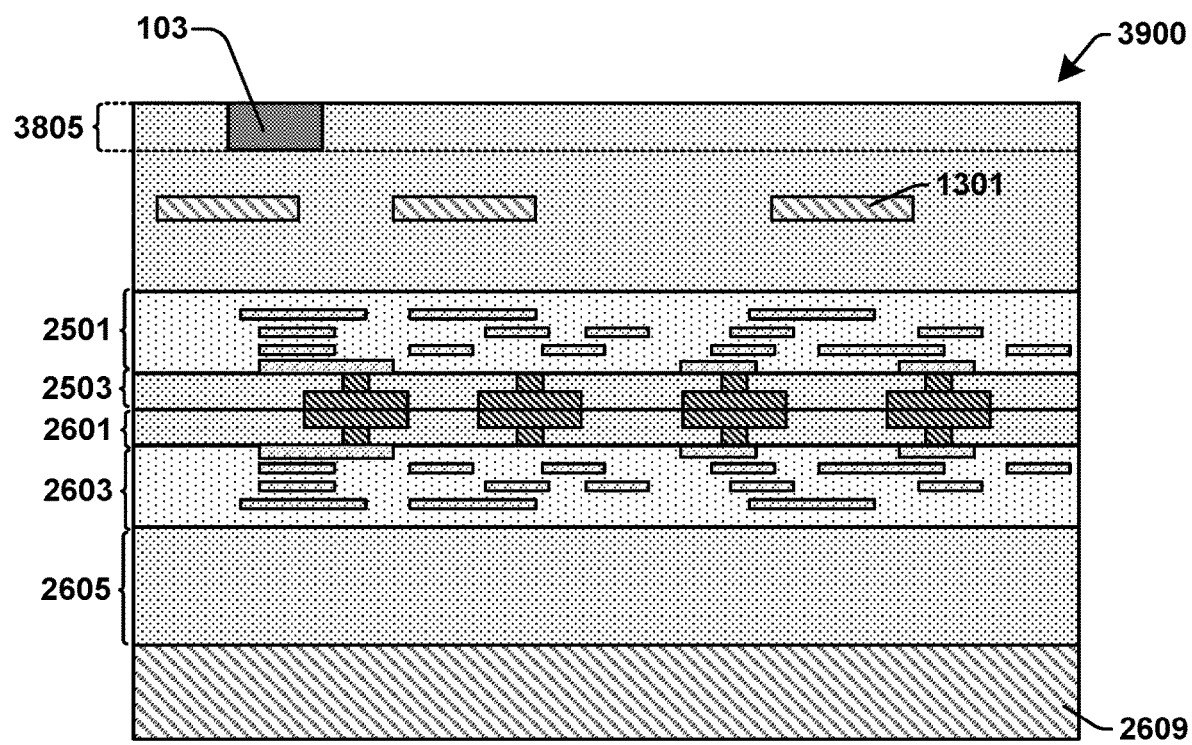

As shown by the cross-sectional view 3700 of FIG. 36, a metal or other conductive material may be deposited in the trenches 3603 and the hole 3605 followed by planarization to form wires 3701 and a via 3703. The deposition process may be CVD, PVD, ALD, electroplating, electroless plating, the like, or any other suitable process. The planarization may be CMP or the like.

FIGS. 37-46 illustrate a variation of the foregoing processes that may be used to form a cladding layer that contains devices of an ordinary optical material and devices of a nonlinear optical material. As show by the cross-sectional views 3800 of FIG. 38, the method may begin with forming the waveguide 103. The waveguide 103 may be formed by depositing a layer of ordinary optical material and using the mask 1501 to etch the ordinary optical material as in the process shown by the cross-sectional views 1400-1500 of FIGS. 14-15.

Figure 39:
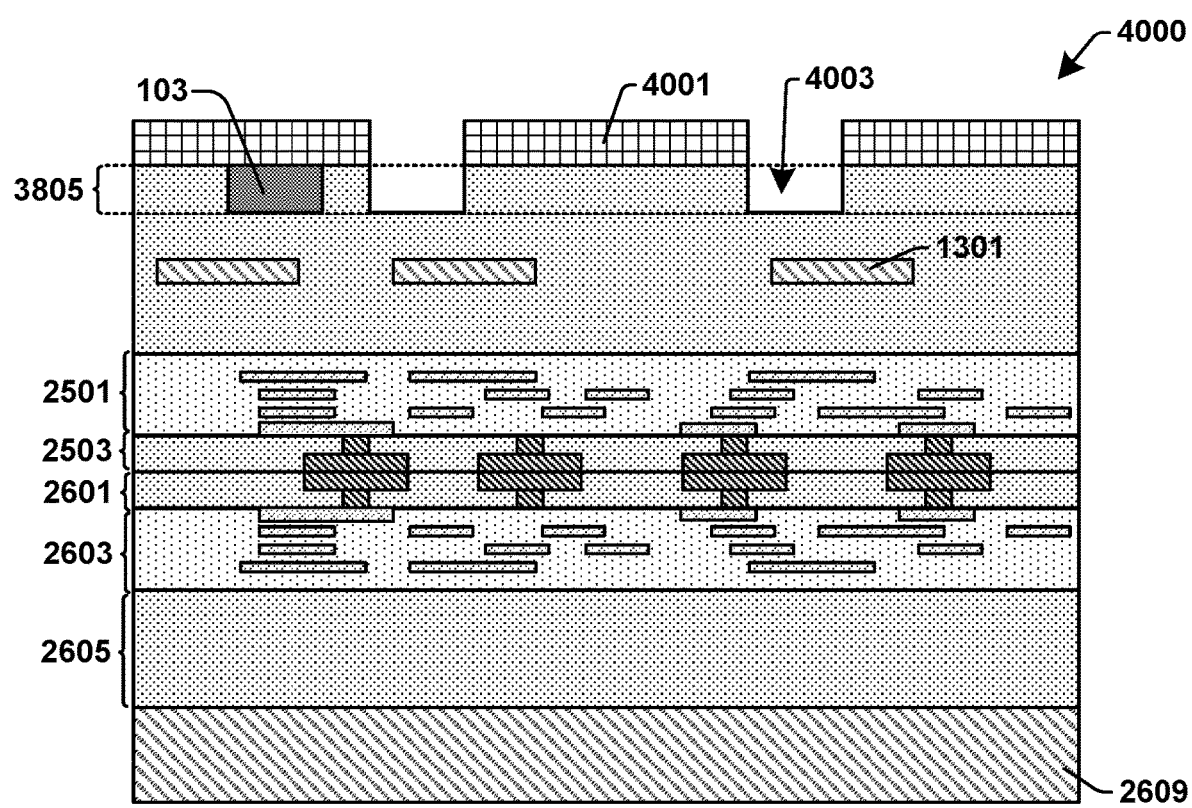

As shown by the cross-sectional view 4000 of FIG. 39, a mask 4001 may be formed, patterned, and used to etch a ring-shaped trench 4003 in the cladding 107 within the layer 3805. In some embodiments, the ring-shaped trench 4003 extends below the layer 3805. In some embodiments, the ring-shaped trench 4003 has the same depth as the layer 3805. In some embodiments, the ring-shaped trench 4003 is shallower than the layer 3805. The mask 4001 may be patterned by E-beam lithography, photolithography, the like, or any other suitable process. The etch process may be plasma etching, the like, or any other suitable process. After etching, the mask 4001 may be stripped.

Figure 40:
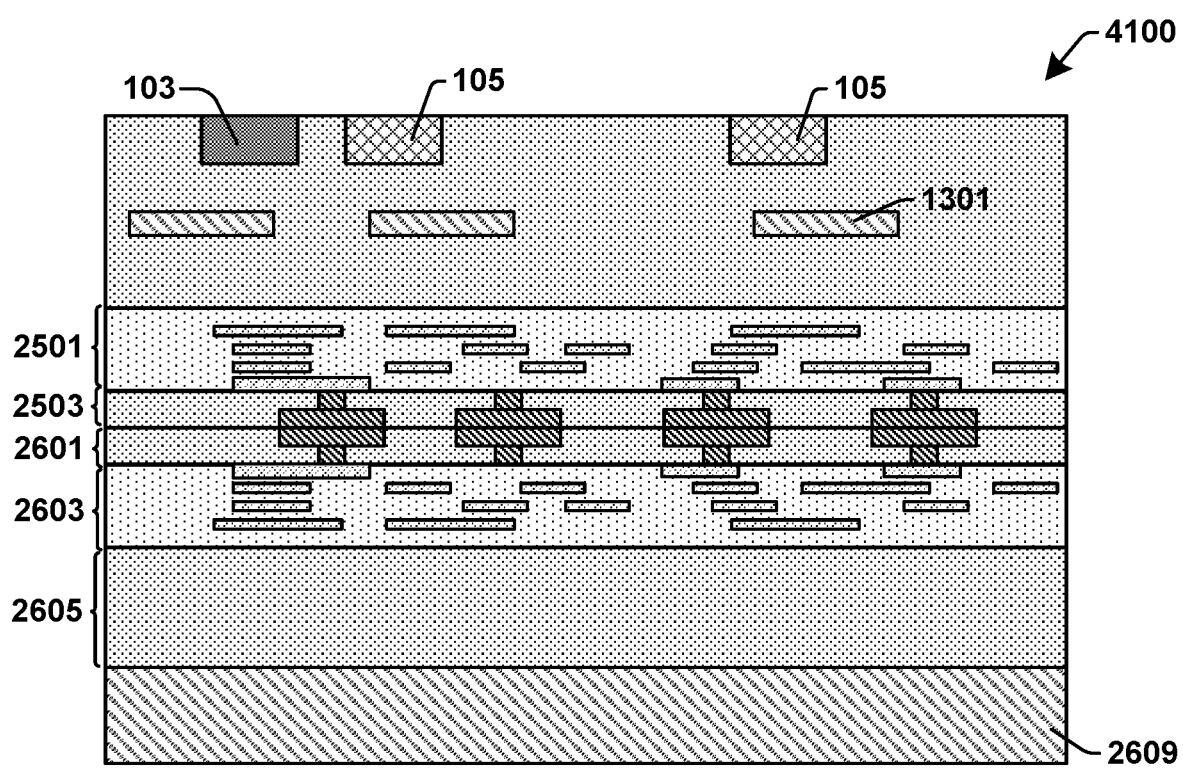

As shown by the cross-sectional view 4100 of FIG. 40, a nonlinear optical material may be used to fill the ring-shaped trench 4003 and form the ring resonator 105. The deposition process may be CVD. PVD, ALD, the like, or any other suitable process. Deposition may be followed by planarization by CMP or the like.

Figure 41:
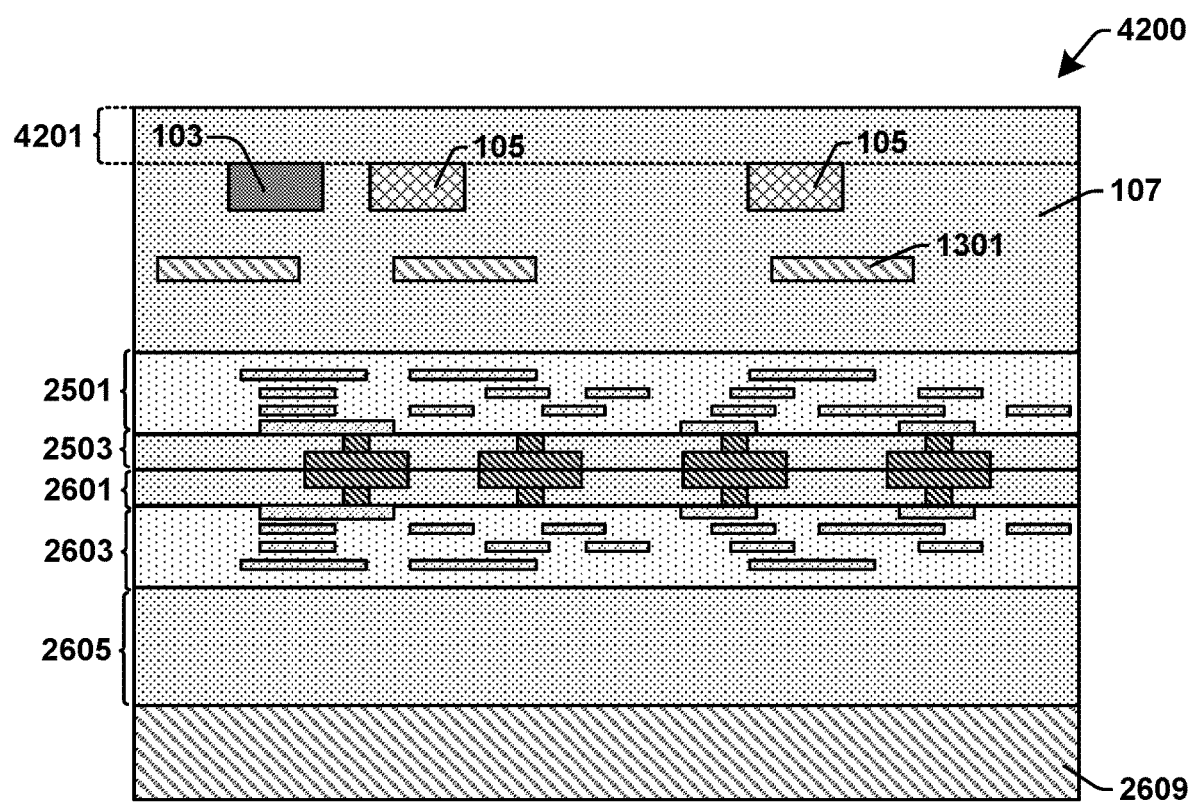

As shown by the cross-sectional view 4200 of FIG. 41, an additional layer 4201 of cladding 107 may be deposited over the structure shown by the cross-sectional view 4100 of FIG. 40. The additional layer 4201 may be deposited by CVD, PVD, ALD, the like, or any other suitable process.

Figure 42:
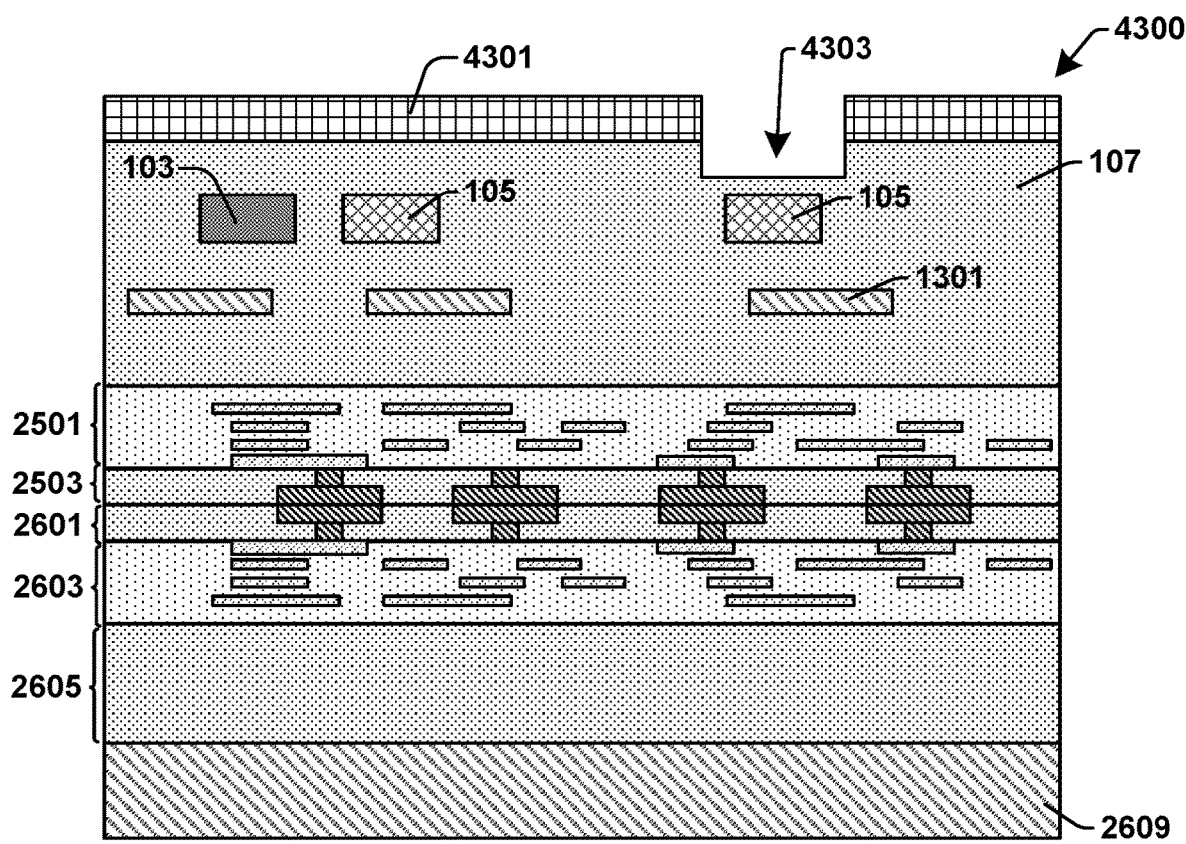

As shown by the cross-sectional view 4300 of FIG. 42, a mask 4301 may be formed, patterned, and used to etch a trench 4303 in the cladding 107. The patterning process may be E-beam lithography, photolithography, the like, or any other suitable process. The etch process may be plasma etching, the like, or any other suitable process.

Figure 43:
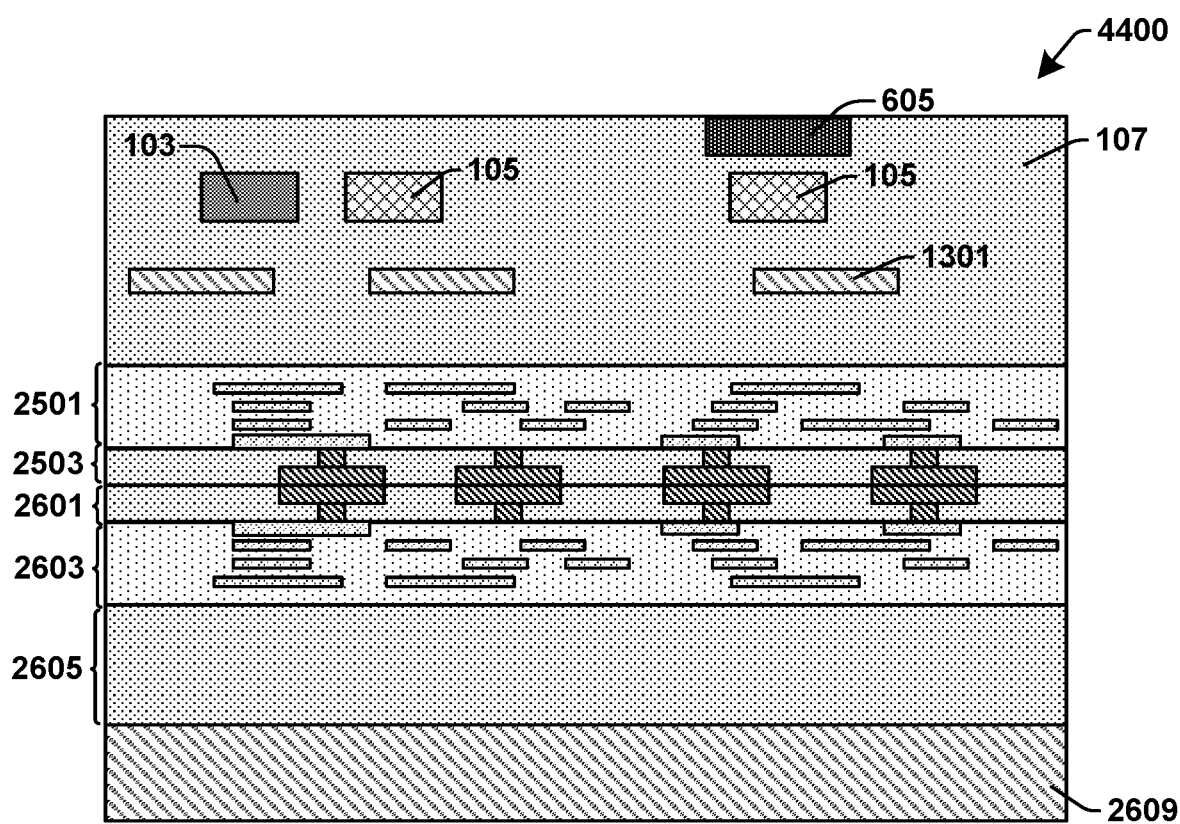

As shown by the cross-sectional view 4400 of FIG. 43, a conductive material may be used to fill the trench 4303 and form the heating element 605. The conductive material may be a metal, polysilicon, graphene, the like, or any other suitable material. In some embodiments, the conductive material is a metal. The deposition process may be CVD, PVD, ALD, electroplating, electroless plating, the like, or any other suitable process. Deposition may be followed by planarization by CMP or the like.

Figure 44:
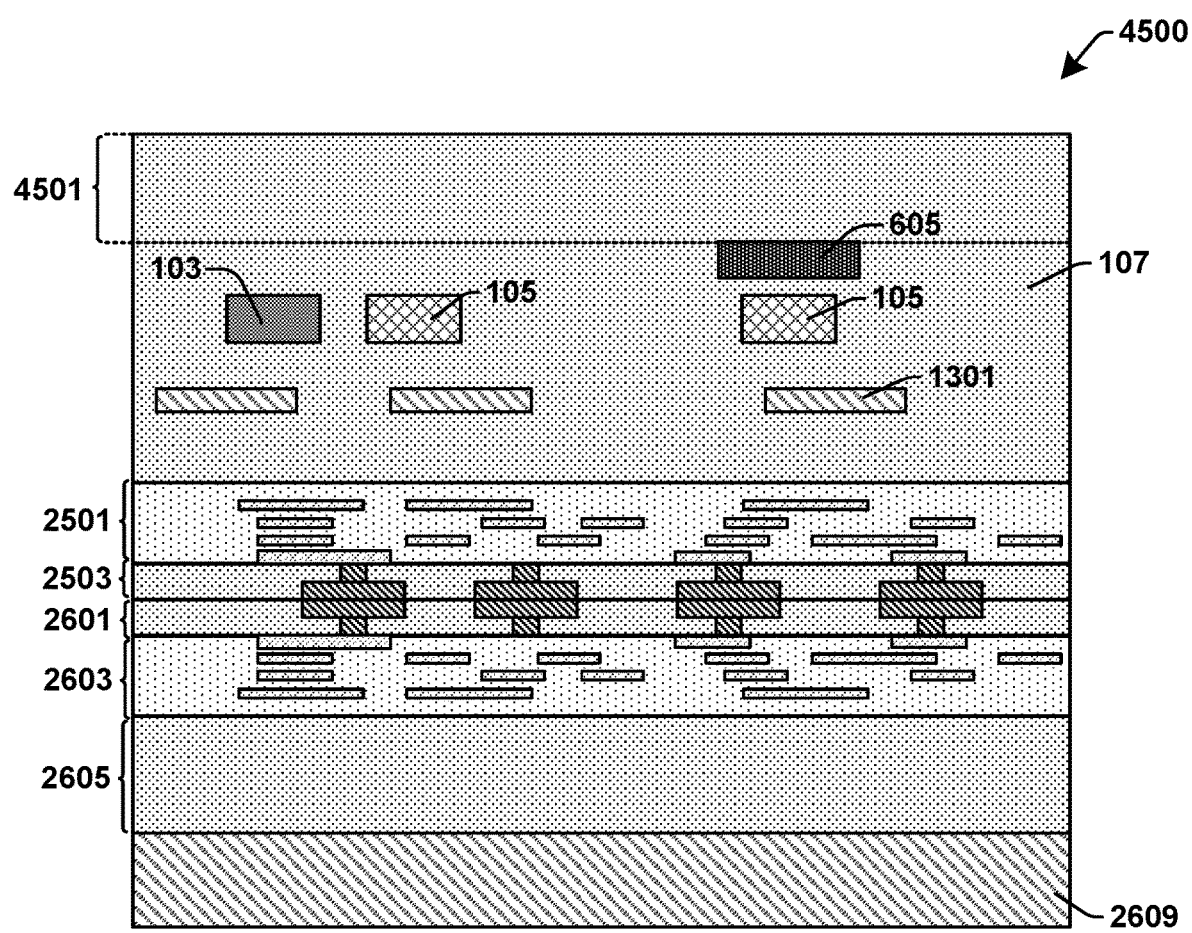

As shown by the cross-sectional view 4500 of FIG. 44, an additional layer 4501 of the cladding 107 and/or some other dielectric material may be deposited. The additional layer 4501 may be deposited by CVD, PVD, ALD, the like, or any other suitable process.

Figure 45:
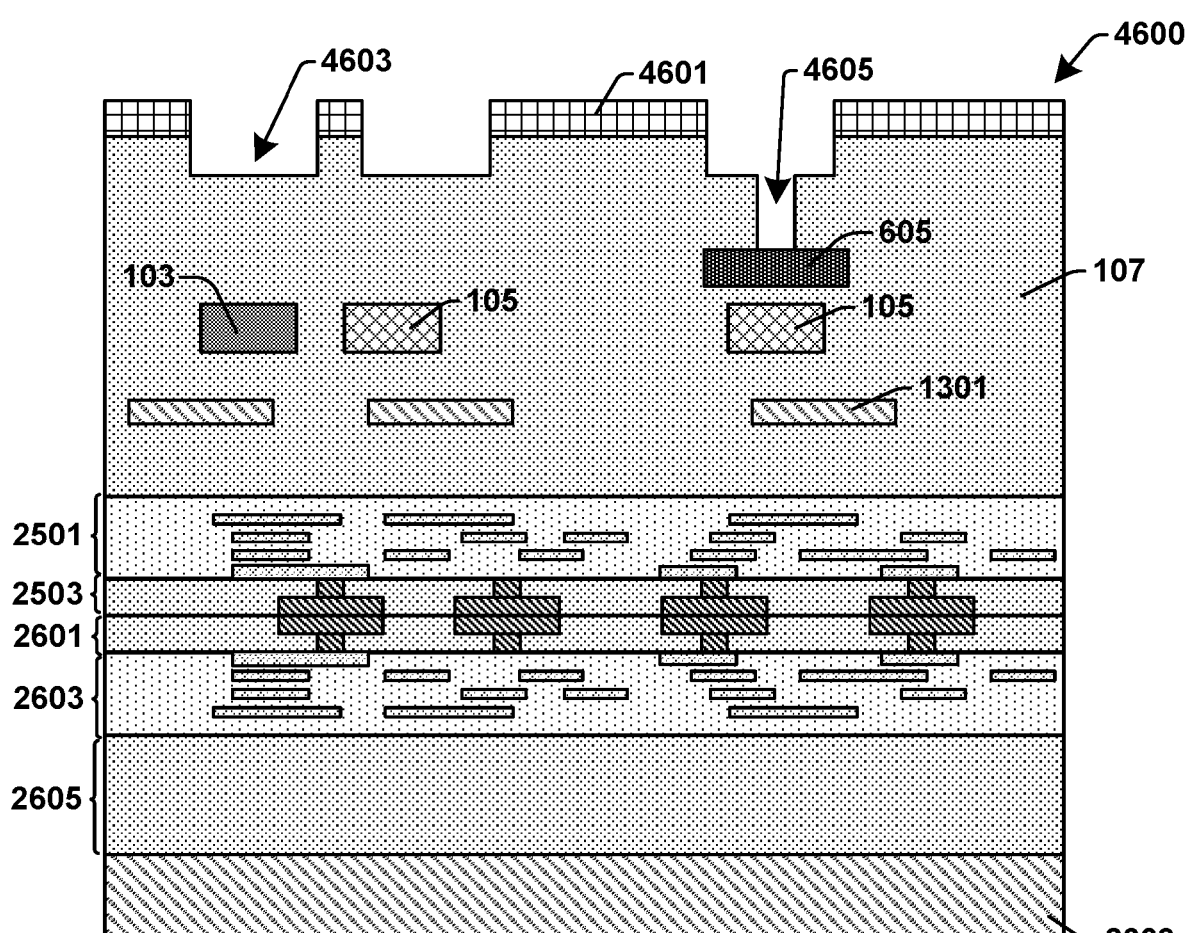

As shown by the cross-sectional view 4600 of FIG. 45, a mask 4601 may be formed and used to etch trenches 4603 in the cladding 107. An additional mask (not shown) may be formed and used to etch a hole 4605 within one of the trenches 4603 to expose an electrode of the heating element 605.

Figure 46:
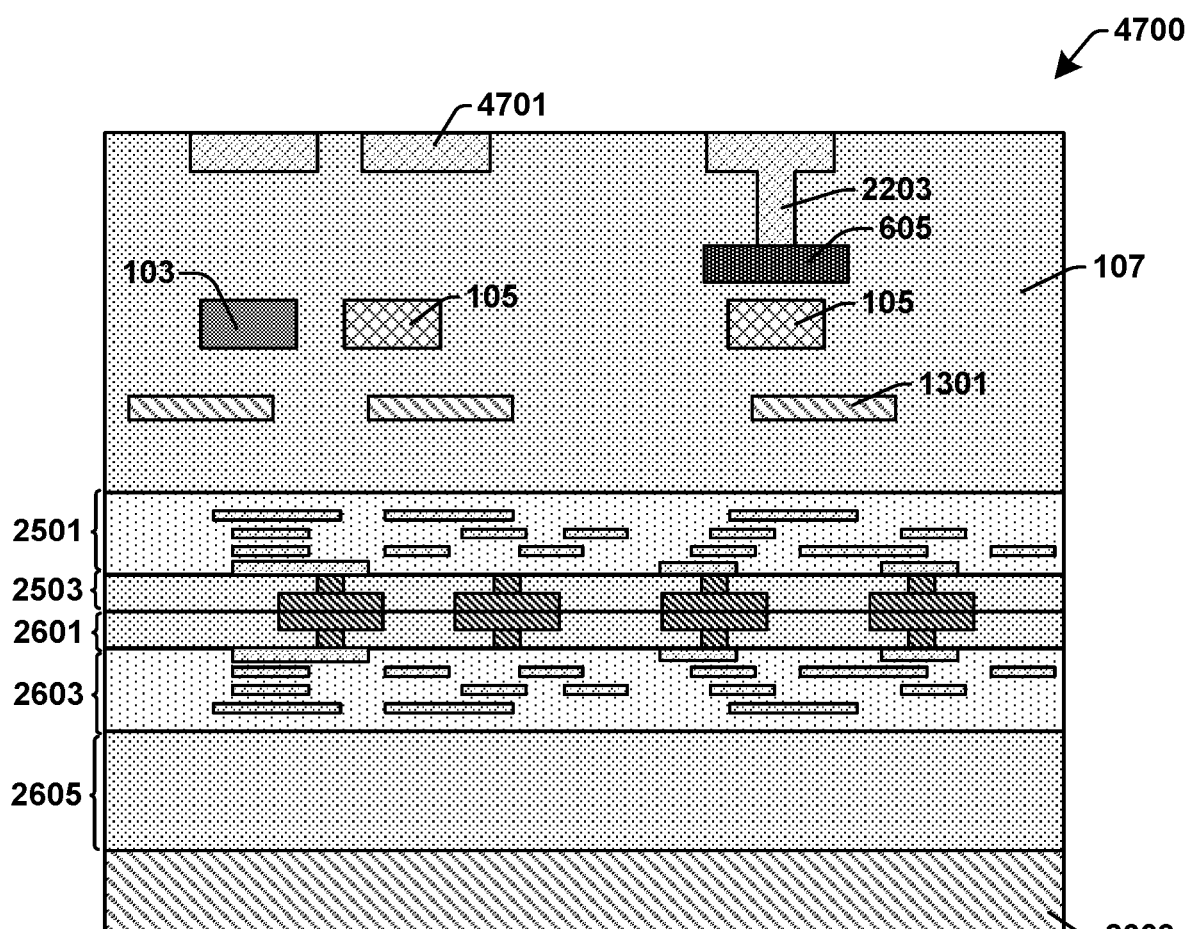

As shown by the cross-sectional view 4700 of FIG. 46, a metal or other conductive material may be deposited in the trenches 4603 and the hole 4605 followed by planarization to form wires 4701 and the via 2203. The deposition process may be CVD, PVD, ALD, electroplating, electroless plating, the like, or any other suitable process. The planarization may be CMP or the like.

Figure 47:
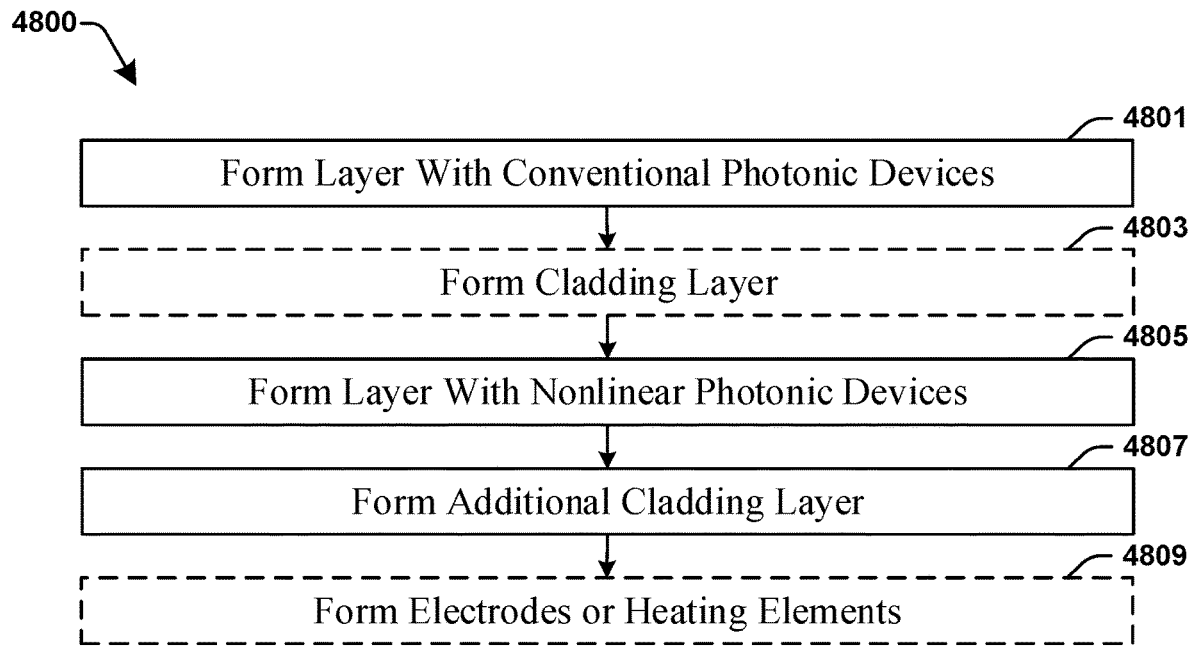
FIG. 47 provides a flow chart illustrating a method of forming a PIC device according to some embodiments.

FIG. 47 presents a flow chart for a process 4800 that may be used to form a PIC device according to the present disclosure. The process 4800 includes steps for forming a PIC device having a nonlinear optical material in a separate layer from an ordinary optical material. While the process 4800 of FIG. 47 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts are required to implement one or more aspects or embodiments of the description herein, and one or more of the acts depicted herein may be carried out in one or more separate acts and/or phases.

Figure 28:
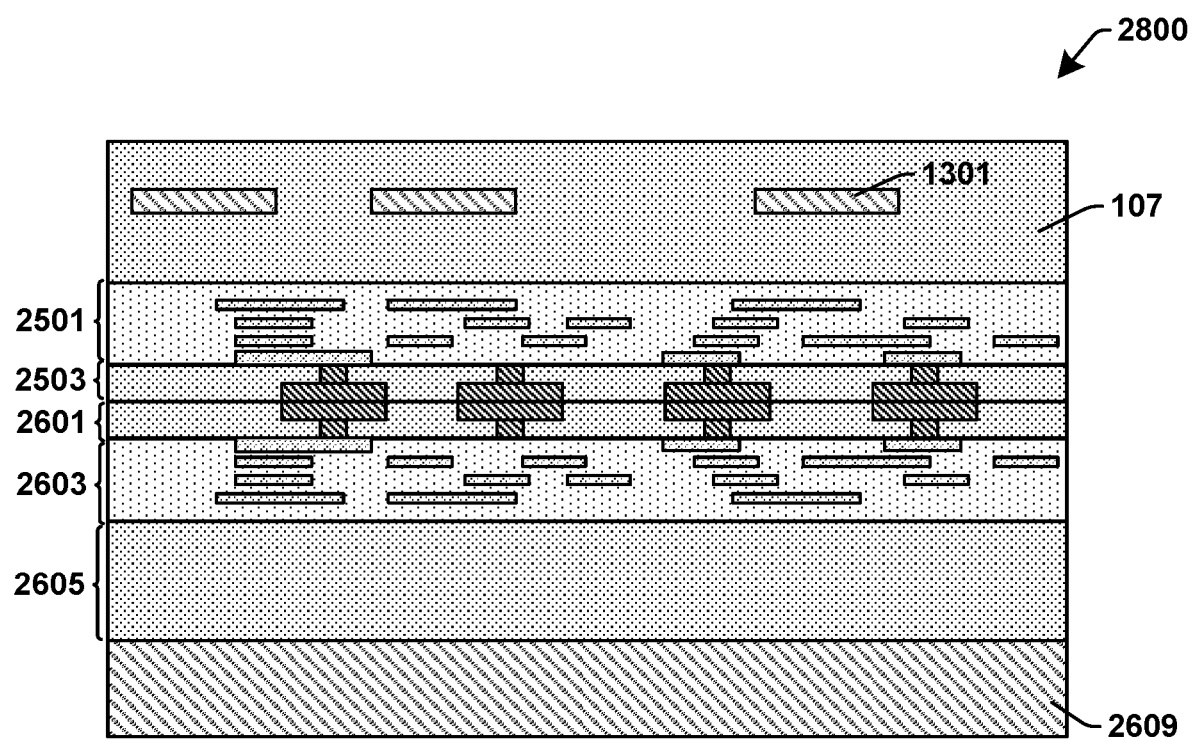

The process 4800 may begin with act 4801, forming a layer with first photonic devices inlaid within cladding material. The first photonic devices are structures of ordinary optical material. In some embodiments, the first optical material is deposited before the cladding material. The cross-sectional views 1400-1600 of FIGS. 14-16 provide an example. The cross-sectional views 2800-3000 of FIGS. 28-30 provide another example.

The process 4800 optionally continues with act 4803, forming a layer of cladding material. This action may be used to provide vertical spacing between the structures of ordinary optical material and the structures of nonlinear optical material. The cross-sectional view 1600 of FIG. 16 provides an example of a process in which this cladding layer is formed.

The process 4800 continues with act 4805, forming a layer with nonlinear photonic devices inlaid within cladding material. The nonlinear photonic devices are structures of nonlinear optical material. In some embodiments, the nonlinear optical material is deposited before the cladding material. In some embodiments, the nonlinear optical material is deposited after the cladding material. The cross-sectional views 1600-1800 of FIGS. 16-18 provide an example. The cross-sectional views 3200-3400 of FIGS. 31-33 provide another example.

The process 4800 continues with act 4805, forming another layer of cladding material. The cross-sectional view 1900 of FIG. 19 provides an example. The process optionally continues with act 4807, forming electrodes or heating elements. The cross-sectional views 2000-2100 of FIGS. 20-21 provide an example. In some embodiments of the process 4800, the layer with nonlinear optical material, is deposited before the layer with ordinary optical material. In some embodiments of the process 4800, heating elements or electrodes are formed before the layer with nonlinear optical material.

Figure 48:
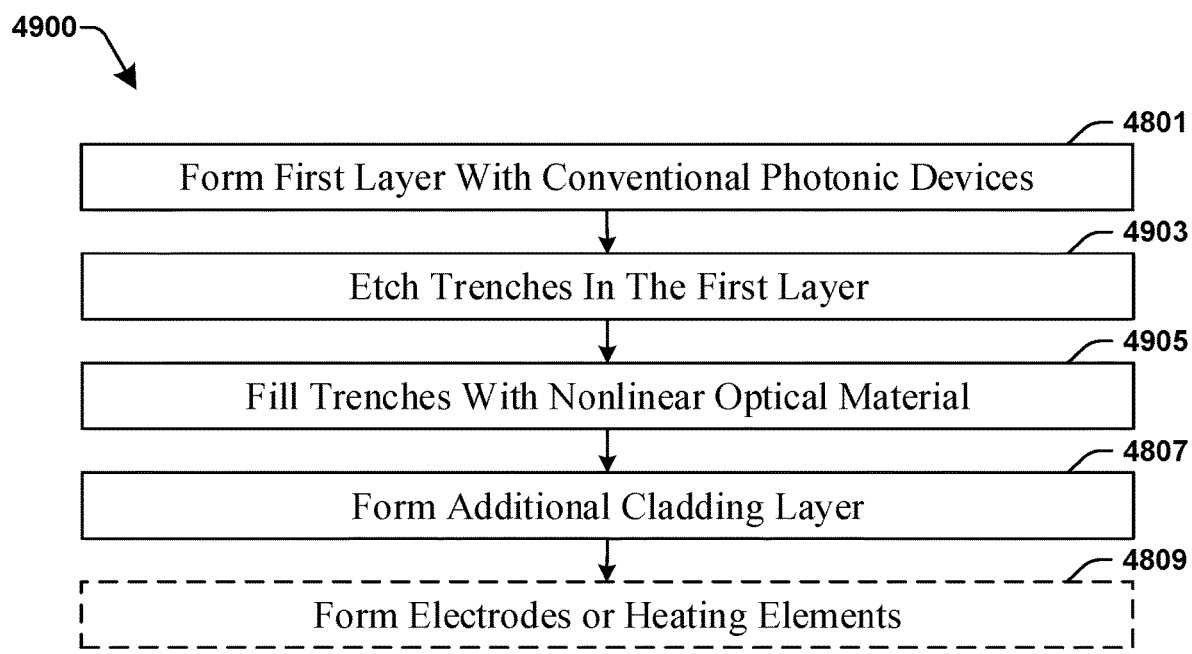
FIG. 48 provides a flow chart illustrating a method of forming a PIC device according to some other embodiments.

FIG. 48 presents a flow chart for a process 4900 that may be used to form a PIC device according to the present disclosure. The process 4900 includes steps for forming a PIC device having structures of a nonlinear optical material and structures of an ordinary optical material in one layer. While the process 4900 of FIG. 48 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts are required to implement one or more aspects or embodiments of the description herein, and one or more of the acts depicted herein may be carried out in one or more separate acts and/or phases.

The process 4900 may begin with act 4801, forming a layer with first photonic devices of ordinary optical material. The process 4900 continues with act 4903, etching trenches in the first layer. The cross-sectional view 4000 of FIG. 39 provides an example. The process 4900 continues with act 4905, filling the trenches with a nonlinear optical material. The cross-sectional view 4100 of FIG. 40 provides an example. The process 4900 may then continue with act 4807, forming an additional layer of cladding material and with act 4809, forming electrodes or heating elements. In some embodiments of the process 4900, the nonlinear optical material is deposited before the ordinary optical material. In some embodiments of the process 4900, heating elements or electrodes are formed before the layer with nonlinear optical material.

Figure 49:
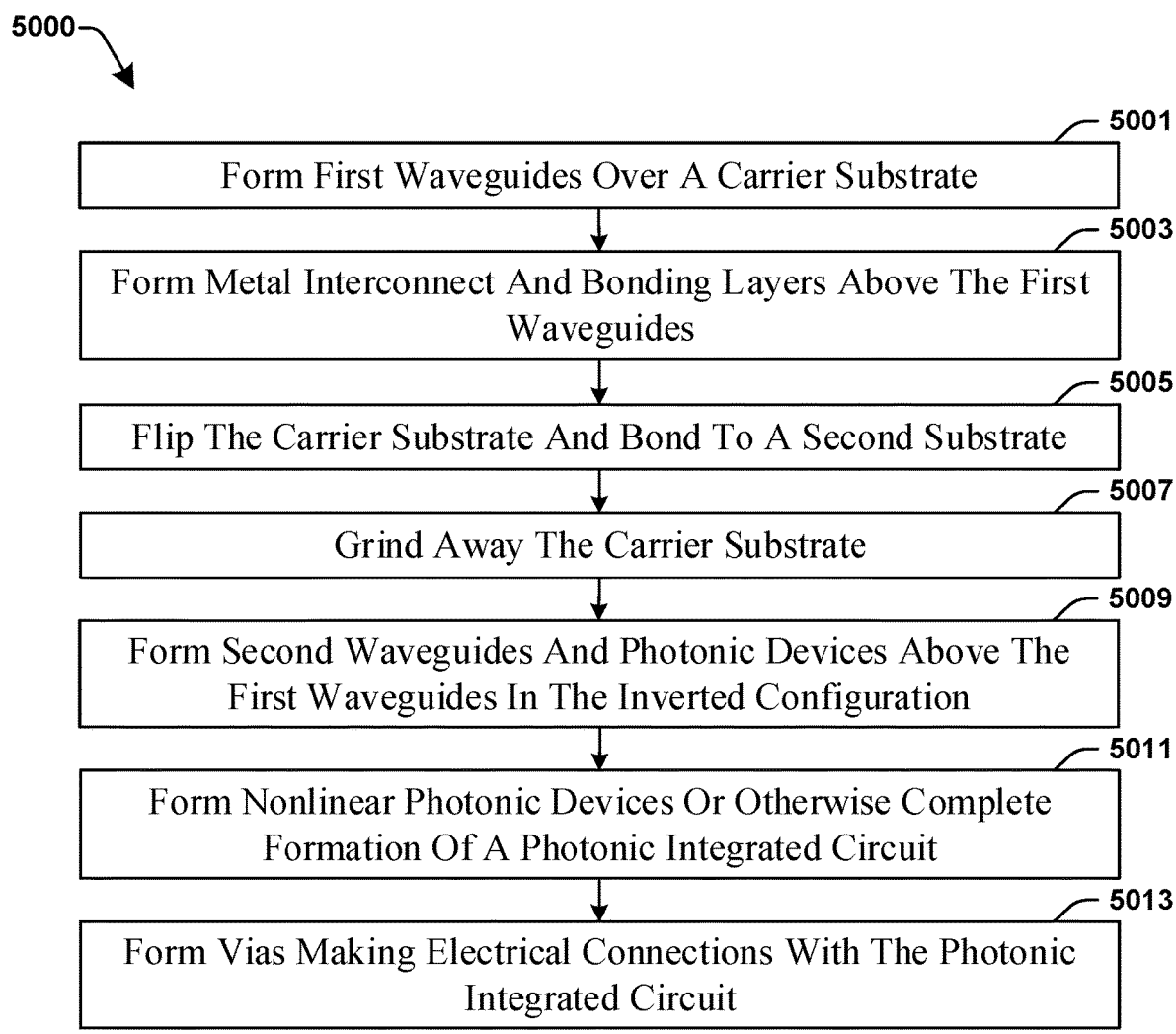
FIG. 49 provides a flow chart illustrating a method of forming a PIC device according to some other aspects of the present disclosure.

FIG. 49 presents a flow chart for a process 5000 that may be used to form a PIC device according to the present disclosure. While the process 5000 of FIG. 49 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts are required to implement one or more aspects or embodiments of the description herein, and one or more of the acts depicted herein may be carried out in one or more separate acts and/or phases.

The process 5000 begins with act 5001, forming first waveguides and other photonic devices over a carrier substrate. The cross-sectional view 2300 of FIG. 23 provides an example. Act 5003 is forming metal interconnect and bonding layers above the first waveguides. The cross-sectional view 3400 of FIG. 24 provides an example. Optionally, electrical connections (not shown) are formed between the metal interconnect and some of the other photonic devices.

Act 5005 is flipping over (inverting) the carrier substrate and binding it to a second structure through the bonding layer. The cross-sectional views 2400-2700 of FIGS. 24-27 provide an example. The inversion does not need to be a physical inversion, but rather represents a transition from a phase in which processing takes place on a front side of the partially manufactured device to a phase in which processing takes place on an opposite side of the partially manufactured device.

Act 5007 is grinding or polishing to remove the carrier substrate. The cross-sectional view 2800 of FIG. 28 provides an example.

Act 5009 is forming second waveguides and other photonic device. The other photonic devices may comprise the same optical material as the second waveguides. The second waveguides will be above the first waveguides in the inverted configuration. The cross-sectional views 2900-3000 of FIGS. 29-30 provide an example. In some embodiments, the second waveguides are of an ordinary optical material. In some embodiments, the second waveguides are of an ordinary optical material that is distinct from an ordinary optical material that comprises the first waveguides.

Act 5011 is forming nonlinear photonic devices or otherwise completing the formation of a photonic integrated circuit that includes the second waveguides. The cross-sectional views 3100-3500 of FIGS. 30-34 provide one example. The cross-sectional views 3900-4200 of FIGS. 38-41 provide another example.

Act 5013 if forming vias that make electrical connections with the photonic integrated circuit. The cross-sectional views 3500-3700 of FIGS. 34-36 provide an example.

Some aspects of the present disclosure relate to a PIC device that includes a first photonic device directly coupled to a second photonic device in a photonic circuit. The first photonic device comprises a material that is non-crystalline or has a centrosymmetric crystalline structure. The second photonic device comprises a material with non-centrosymmetric crystalline structure. In some embodiments, the second photonic device is separated from the first photonic device by cladding material and is optically coupled to the first photonic device through evanescent coupling. In some embodiments, the first photonic device is in direct contact with the second photonic device. In some embodiments, the first photonic device and the second photonic device are disposed at different heights over a substrate.

In some embodiments, the first photonic device is directly under or directly over the second photonic device and is spaced apart from the second photonic device by a layer of cladding material. In some of these embodiments, the second photonic device is laterally offset from the first photonic device. In some embodiments, the first photonic device is a waveguide, and the second photonic device is an optical resonator. In some embodiments, the first photonic device is a first optical resonator, the second photonic device is a second optical resonator, and the PIC further comprises a waveguide of the first optical material directly coupled to the first photonic device. In some embodiments, the first optical resonator is in directly over or under the second optical resonator. In some embodiments, the PIC device further includes a heating element positioned to selectively heat the first photonic device or the second photonic device so that the first photonic device or the second photonic device may be held at different temperatures. In some embodiments, the PIC device further includes a first heating element positioned to selectively heat the first photonic device and a second heating element position to selectively heat the second photonic device. In some embodiments, the second photonic device is connected in parallel with the first photonic device within the photonic integrated circuit. In some embodiments, the first photonic device is silicon nitride, and the second photonic device is aluminum nitride.

Some aspects of the present disclosure relate to a PIC device that includes a waveguide and an optical resonator disposed over a substrate. The optical resonator is evanescently coupled to the waveguide in a photonic integrated circuit. The waveguide and the optical resonator are at different heights over the substrate. In some embodiments, the optical resonator is laterally spaced from the waveguide. In some embodiments, the waveguide passes directly under or over the optical resonator. In some embodiments, the optical resonator is a ring resonator, and the waveguide passes directly under or over the optical resonator at two distinct locations. In some embodiments, the waveguide undergoes a change in direction directly over or directly under or over the optical resonator.

Some aspects of the present disclosure relate to a method of forming a PIC device that includes forming a base layer of a cladding material, forming a first device layer comprising a first photonic device inlaid within the cladding material, and forming a second device layer over the first device layer. The second device layer includes a second photonic device inlaid within the cladding material. One and only one of the first photonic device and the second photonic device comprises nonlinear optical material. The first photonic device is couple to the second photonic device in a photonic integrated circuit. In some embodiments, the method further includes forming a layer of the cladding material between the first device layer and the second device layer.

Some aspects of the present disclosure relate to a method of forming a PIC device that includes forming a base layer of a cladding material, forming a first device layer comprising a first photonic device inlaid within the cladding material, forming a spacer layer over the first device layer, and forming a second device layer comprising a second photonic device within the cladding material. The second photonic device is evanescently coupled to the first photonic device in a photonic circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating a photonic integrated circuit device, the method comprising:
    forming a first layer over a substrate, the first layer comprising a first optical device of a first material;
    performing a chemical mechanical polishing step on the first layer;
    forming a second layer over the first layer, the second layer comprising a second optical device of a second material; and
    wherein the first optical device is in direct physical contact with the second optical device;
    one of the first optical device and the second optical device is a first ring resonator and the other is either a disk resonator, a second ring resonator, or a waveguide; and
    one of the first and the second materials is a nonlinear optical material having a non-centrosymmetric crystalline structure, and the other is a linear optical material having either a non-crystalline structure or a centrosymmetric crystalline structure.

2. The method of claim 1, wherein forming the first layer comprises:
    depositing a layer of cladding;
    etching trenches in the layer of cladding; and
    depositing the first material so as to fill the trenches.

3. The method of claim 1, wherein forming the first layer comprises:
- depositing the first material;
- patterning the first material; and
- depositing cladding over the first material.

4. The method of claim 1, wherein the second material is the nonlinear optical material.

5. The method of claim 4, further comprising forming a metal heating element directly over the second optical device, wherein the metal heating element is configured to selectively heat the second optical device without heating other optical devices in the second layer.

6. The method of claim 1, wherein the substrate is a silicon on insulator substrate comprising a silicon layer, and the method further comprises:
- patterning the silicon layer to form silicon waveguides; and
- depositing cladding over the silicon waveguides, wherein the first layer is formed over the cladding.

7. The method of claim 3, wherein forming the second layer comprises:
- depositing the second material;
- patterning the second material; and
- depositing cladding over the second material.

8. The method of claim 1, wherein the first optical device and the second optical device are horizontally aligned ring resonators.

9. The method of claim 1, wherein of the first optical device and the second optical device, only the one composed of the linear optical material is directly coupled to a waveguide.

10. The method of claim 1, wherein one of the first optical device and the second optical device is a ring resonator and the other is a disk resonator horizontally aligned with the ring resonator.

11. The method of claim 1, wherein one of the first optical device and the second optical device is a ring resonator, the other is a waveguide, and the nonlinear optical material is aluminum nitride.

12. A method of fabricating a photonic integrated circuit device, the method comprising:
- forming a first layer over a substrate, the first layer including a first ring or disk resonator composed of a first material;
- performing a chemical mechanical polishing (CMP) step on the first layer to planarize a surface of the first layer; and
- forming a second layer over the planarized surface of the first layer, the second layer including a second ring or disk resonator composed of a second material;
- wherein the first ring or disk resonator is in direct physical contact with the second ring or disk resonator along a planar interface;
- the first material is a nonlinear optical material having a non-centrosymmetric crystalline structure; and
- the second material is a linear optical material having either a non-crystalline structure or a centrosymmetric crystalline structure.

13. The method of claim 12, wherein the nonlinear optical material comprises aluminum nitride, lithium niobate, silicon carbide, indium phosphide, gallium arsenide, or aluminum gallium arsenide.

14. The method of claim 12, wherein the nonlinear optical material comprises aluminum nitride.

15. The method of claim 12, wherein the linear optical material comprises silicon or silicon nitride.

16. A method of forming a photonic integrated circuit (PIC) device, the method comprising:
- forming a first device layer over a substrate, wherein the first device layer comprises a first photonic device inlaid within a first cladding material, the first photonic device comprising an ordinary optical material having a centrosymmetric crystalline structure or an amorphous structure; and
- forming a second device layer over the substrate, wherein the second device layer comprising a second photonic device inlaid within a second cladding material, the second photonic device comprising a nonlinear optical material having a non-centrosymmetric crystalline structure and a non-zero second-order nonlinear susceptibility;
- wherein the first device layer and the second device layer have distinct elevations over the substrate;
- the first photonic device is a waveguide, a ring resonator, or a disk resonator;
- the second photonic device is a ring resonator or a disk resonator configured to provide a nonlinear optical effect; and
- the first photonic device and the second device layer are photonically coupled and have no vertical separation.

17. The method of claim 16, wherein the second photonic device is in direct contact with the first photonic device.

18. The method of claim 16, wherein the second photonic device is laterally offset from the first photonic device.

19. The method of claim 16, wherein the first photonic device is a waveguide and the second photonic device is a ring resonator configured to provide a nonlinear optical effect.

20. The method of claim 16, wherein the first photonic device is a first ring resonator and the second photonic device is a second ring resonator.

* * * * *